United States Patent
Peale et al.

(10) Patent No.: US 6,480,645 B1
(45) Date of Patent: Nov. 12, 2002

(54) SIDEWALL ELECTRODES FOR ELECTROSTATIC ACTUATION AND CAPACITIVE SENSING

(75) Inventors: David R. Peale, Tinton Falls, NJ (US); Patrick Breckow Chu, Middletown, NJ (US); Sangtae Park, Middletown, NJ (US); Nicolas H. Bonadeo, Aberdeen, NJ (US); Shi-Sheng Lee, Middletown, NJ (US); Ming-Ju Tsai, Livingston, NJ (US)

(73) Assignee: Tellium, Inc., Oceanport, NJ (US)

( * ) Notice: Subject to any disclaimer, the term of this patent is extended or adjusted under 35 U.S.C. 154(b) by 137 days.

(21) Appl. No.: 09/772,084

(22) Filed: Jan. 30, 2001

(51) Int. Cl.$^7$ ............................................. G02B 6/26
(52) U.S. Cl. ........................ 385/18; 385/16; 385/17; 359/224
(58) Field of Search ........................ 385/16–23, 25, 385/24, 8, 40; 359/223, 224

(56) References Cited

U.S. PATENT DOCUMENTS

| | | | |
|---|---|---|---|
| 6,253,001 B1 | * | 6/2001 | Hoen ............................ 385/17 |
| 6,396,976 B1 | * | 5/2002 | Little et al. ..................... 385/18 |
| 6,430,333 B1 | * | 8/2002 | Little et al. ..................... 385/18 |

FOREIGN PATENT DOCUMENTS

WO    WO 99/66354    12/1999

OTHER PUBLICATIONS

Yong S. Lee et al., "A Batch–Fabricated Silicon Capacitive Pressure Transducer with Low Temperature Sensitivity," *IEEE Transactions on Electron Devices*, vol. ED–29, No. 1 (Jan.) 1982, pp. 42–48.

F. Rudolf, "A Micromechanical Capacitive Accelerometer with A Two–Point Inertial–Mass Suspension," *Sensors and Actuators*, vol. 4, No. 2 (Oct.) 1983, pp. 191–198.

Joseph T. Kung et al., "A Digital Readout Technique for Capacitive Sensor Applications," *IEEE Journal of Solid-State Circuits*, vol. 23, No. 4, (Aug.) 1988, pp. 972–977.

Mark Van Paemel, "Interface Circuit for Capacitive Accelerometer," *Sensors and Actuators*, vol. 17, Nos. 3&4 (May) 1989, pp. 629–637.

Yu–Chong Tai et al., "IC–processed Electrostatic Synchronous Micromotors," *Sensors and Actuators*, vol. 20, Nos. 1&2 (Nov.) 1989, pp. 49–55.

William C. Tang, et al., "Electrostatic Comb Drive Levitation and Control Method," *IEEE Journal of Microelectromechanical Systems*, vol. 1, No. 4 (Dec.) 1992, pp. 170–178.

Robert E. Mihailovich et al., "Single–Crystal Silicon Torsional Resonators," *IEEE* 1993, pp. 184–188.

Michael W. Putty, et al., "A Micromachined Vibrating Ring Gyroscope," *Solid–State Sensor and Actuator Workshop*, Hilton Head, South Carolina, Jun. 13–16 (Jun.) 1994, pp. 213–220.

D.T. Neilson et al., "*Fully Provisioned 112×112 Micro–Mechanical Optical Crossconnect with 35.8Tb/s Demonstrated Capacity*," *Technical Digest Series—Post Deadline Papers*, Optical Fiber Communication Conference (OSA), Mar. 7–10, 2000, pp. 1–3.

\* cited by examiner

Primary Examiner—Phan T. H. Palmer
(74) Attorney, Agent, or Firm—Morgan, Lewis & Bockius LLP

(57) ABSTRACT

A structure and method for an optical switch is provided that includes providing sidewall electrodes with steerable micromirrors to position and control micro-mirror movement. The structure and method includes using the sidewall electrodes in conjunction with electrodes underlying a micro-mirror to sense capacitance present between a micro-mirror and underlying electrodes and/or sidewall electrodes, and driving the electrodes underlying the micro-mirror and the sidewall electrodes to move the micro-mirror into an angular position. The electrode structures and methods of driving them may be used in systems with closed loop feedback control to reduce transient mirror settling time and provide substantial immunity to system perturbations when micromirrors switch an optical signal from an input fiber to an output fiber of the optical switch, or when a micro-mirror is held at an angular position over long time scales.

28 Claims, 12 Drawing Sheets

SIDEWALL ELECTRODES FOR ELECTROSTATIC ACTUATION AND CAPACITIVE SENSING

BACKGROUND OF THE INVENTION

1. Field of the Invention

The present invention relates to structures for controlling and monitoring positions of movable switching elements in an optical switch, and more particularly to electrode structures for controlling and sensing angular positions of micromachined micro-mirrors in an optical switching device.

2. Description of the Related Art

Increasing demands for high-speed Internet service and wireless communications are soon expected to outstrip current telecommunications capacity. Because optical fiber networks are capable of transmitting huge volumes of data at blinding speeds, telecommunications carriers are turning to optical fiber networks in an effort to meet future needs.

In order to implement tomorrow's optical fiber networks, the telecommunications industry needs new optical devices that are inexpensive, efficient, and scalable to accommodate future optical telecommunications network expansion. Telecommunications providers prefer optical fiber networks that can be reconfigured quickly and efficiently. This gives the optical network the flexibility to accommodate growth and changes in future communications patterns. The ability to reconfigure quickly and efficiently also enables the network to restore failed communications by rerouting the communications to bypass the failure.

Optical fiber networks can be reconfigured at network nodes using optical switches to change the coupling between incoming optical fibers and outgoing optical fibers. Currently under development are optical switches that use movable micro-mirrors. These optical switches couple the optical signals between input and output fibers entirely in optical form, instead of converting the optical signals to electrical signals, switching the electrical signals, and converting the switched electrical signals back to optical signals.

To successfully operate such switches, the components—including fibers, lenses, and the micro-mirrors—must be properly aligned and the angular position of the movable micro-mirrors must be precisely controlled. If the angular position of the movable micro-mirrors is off and/or if the other components are not properly aligned, some or all of the light from the input fibers will not reach the selected output fiber. At switching speeds necessary for today's optical communication needs, a micro-mirror based switch must rapidly move a mirror into position on command with minimal slew (where a slope of a micro-mirror trajectory output curve is close to a theoretically predicted one). Mirror movement must also quickly settle at a desired position to avoid signal loss. Micro-mirror switch control systems should also be insensitive to perturbations that would otherwise affect mirror position and hold maximum input-to-output optical coupling over long time scales.

Thus, there remains a need in the art for optical switch structures that can efficiently translate electrical signals into micro-mirror actuation to provide quick micro-mirror positioning. There also remains a need in the art for optical switch structures that allow reliable sensing of micro-mirror angular position to precisely control a mirror's movement and/or provide accurate position status, whether a mirror is in a static or dynamic state.

SUMMARY OF THE INVENTION

The present invention has been made in view of the above circumstances and has as an object to provide an efficient and reliable optical switch.

The present invention has another object to provide methods for controlling an optical switch.

One aspect of the present invention is a plurality of electrodes having elongated sidewalls that are used to control movable mirror elements.

Another aspect of the present invention is a plurality of concentrically arranged segmented electrodes.

Yet another aspect of the present invention includes a structure and method for providing control to a movable mirror assembly from a freestanding conductive structure.

Still another aspect of the present invention is a plurality of segmented sidewall electrodes used for sensing a position and/or positioning a movable mirror.

Additional aspects and advantages of the invention will be set forth in part in the description that follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 3c provides a top view of the first exemplary sidewall electrode arrangement included in the optical switch of FIG. 3a.

DESCRIPTION OF THE PREFERRED EMBODIMENTS

Figure 1:
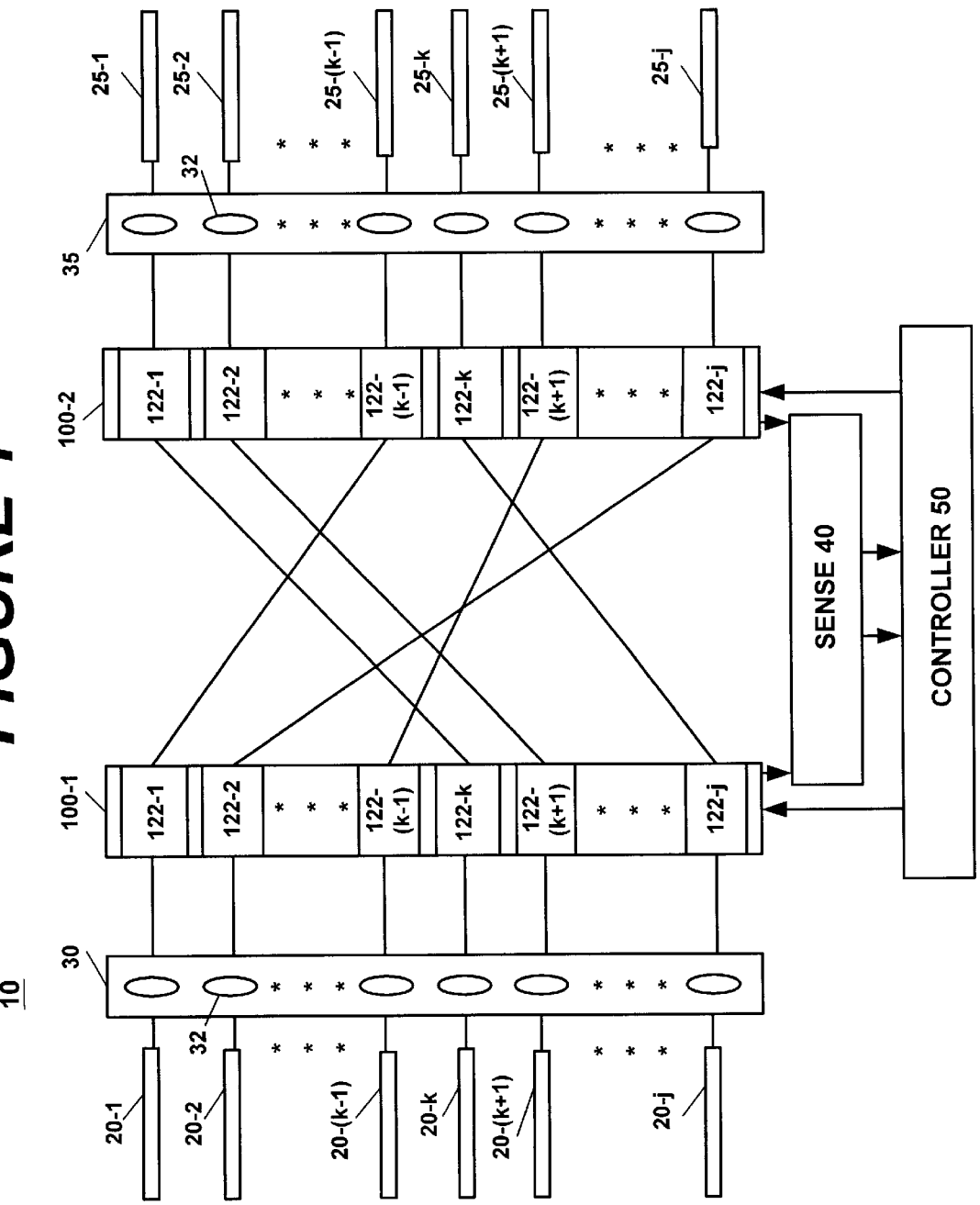
FIG. 1 provides a schematic of an illustrative optical switch design that includes micro-mirrors in accordance with the present invention.

Reference will now be made in detail to the present exemplary embodiments of the invention illustrated in the accompanying drawings. Whenever possible, the same reference numbers will be used throughout the drawings to refer to the same or like parts.

The present invention is particularly useful for control of steerable mirror elements used to switch signals in optical telecommunications network systems that carry optical communications signals, such as wavelength division multiplexed (WDM) signals, over optical fibers. The present invention includes switching structures and methods that efficiently drive micro-mirrors into position and can allow large signal-to-noise ratio (SNR) sensing and processing of capacitance already present within optical switching elements that move through angular displacement.

In particular, the present invention utilizes freestanding sidewall electrodes that are arranged around micro-mirror in an optical switch. These electrodes are used in conjunction with electrodes provided on a cavity floor and underlying a micro-mirror to drive the mirror into an angular position and/or to sense a position of the mirror. Using a sidewall electrode arrangement within a micro-mirror cavity allows for increased positioning torque on a micro-mirror and/or increased capacitance for position sensing compared with a switch that only uses electrodes underlying the micro-mirror. In such a switch without sidewall electrodes, much of the torque from fringing electric fields provided by drive electrodes under the mirror would be lost to the surrounding isolation structure forming the mirror cavity. The increased torque provided from sidewall electrodes allows for lower and more efficient use of micro-mirror actuation power. Sidewall electrodes also provide more micro-mirror electrode surface area and thus increase available capacitance used in position sensing. An increase in capacitance allows for a larger sensed signal and thus a greater SNR for more reliable and accurate mirror position readout and/or feedback signals in digital, analog, or hybrid digital and analog closed-loop control systems. The present invention may by incorporated with such analog and/or digital control systems using feedback signals to enable fine micro-mirror target position acquisition with quick response (a high slew rate) and brief settling time. For a more detailed description of closed loop control system architectures, see copending application Ser. No. 09/756,675, filed Jan. 10, 2001, the entire contents of which are hereby incorporated by reference.

The present invention is particularly useful in optical switches for optical telecommunications network systems that carry optical communications signals, such as wavelength division multiplexed (WDM) signals, over optical fibers. The present invention may be used in connection with an optical mesh communications network or other optical network architectures, such as ring, chains, and stars, among others, as well as other optical applications.

For example, a typical mesh network is made up of any number of optical network elements interconnected through optical links in a mesh pattern. The optical network elements generally communicate information signals to other optical network elements through the optical links. The optical network elements may include optical cross-connects, add-drop multiplexers, or other switching equipment to allow the signals carried on the optical links to be transmitted through the network elements, as necessary, from source to destination. In addition, the optical network elements may be connected to information sources (ingresses) and destinations (egresses) in the locality of that optical network element. Thus, information signals may enter the optical mesh network at a local connection to one of the network element. The information signals may be converted to optical signals (if they are not already), and then travel in the optical network from network element to network element, and to a particular network element where it is passed to a destination in the locality of the particular network element.

FIG. 1 illustrates a schematic of an optical switch 10 according to the present invention. The optical switch 10 according to the present invention may be configured as an optical cross connect (OXC), an add-drop multiplexer (ADM), or another optical switch arrangement.

The optical switch 10 switches optical signals from a plurality of input optical fibers 20-1 to 20-j (collectively "input optical fibers 20") to selected output fibers 25-1 to 25-j (collectively "output optical fibers 25"). The input optical fibers 20 and output optical fibers 25 may be arranged in any way, for example a k×j/k rectangular array, such as a square array. The present invention is not limited by the types of the optical signals carried by the input optical fibers 20 and output optical fibers 25. Each optical input fiber 20 may carry WDM signals, a single wavelength optical signal that was demultiplexed from a WDM signal by a wavelength division demultiplexer, or other types of optical signals. Similarly, each optical output fiber 25 may carry WDM signals, single wavelength optical signal to be multiplexed with other optical signals by a wavelength division multiplexer, or other types of optical signals. The optical signals typically carry information and may have wavelengths of about 1300–1500 nm, for example. While FIG. 1 shows a schematic of an embodiment with j input optical fibers 20 and j output optical fibers 25, the number of input optical fibers may differ from the number of output optical fibers.

The input optical fibers 20 carry optical signals that are supplied, respectively, to a lens arrangement 30. The lens arrangement 30 may include a plurality of micro-lenses 32 arranged in an array. Alternatively, lenses 32 may be integrated with fibers 20. Micro-lenses 32 are preferably arranged so that each input optical fiber 20 is aligned with a micro-lens 32. In this way, optical signals emitted from an input fiber 20 will pass through one of the micro-lenses 32. Micro-lenses 32 direct optical beams from the input optical fibers 20 to a first arrangement of micro-mirrors 100-1, which will be described in greater detail below.

The first micro-mirror arrangement 100-1 includes a plurality of movable micro-mirrors 122. The micro-mirrors 122 may be arranged in an array, e.g., a rectangular or square array. Of course, other arrangements of the micro-mirrors 122 may be used as well. In a preferred embodiment, each input optical fiber 30 corresponds to one micro-lens 32 of the first lens arrangement 30 and one micro-mirror 122 of the first micro-mirror arrangement 100-1. Using the micro-mirrors 122 and responsive to control signals, the first micro-mirror arrangement 100-1 couples the optical beams from the lens array 30 to selected movable micro-mirrors 122 of a second arrangement of micro-mirrors 100-2. The second micro-mirror arrangement 100-2 includes micro-mirrors 122 that may be arranged in an array, e.g., a square or rectangular array or other arrangement. The second micro-mirror arrangement 100-2 need not match the first micro-mirror arrangement 100-1.

Each micro-mirror 122 of the first arrangement 100-1 is preferably movable to permit an input beam to be reflected by the micro-mirror 122 to any micro-mirror 122 of the second arrangement 100-2. The micro-mirrors 122 of the second arrangement 100-2, also responsive to control signals, receive and couple the optical beams through a second lens array 35 to output fibers 25. The second lens arrangement 35 includes micro-lenses 32, which may be arranged in an array, aligned with output optical fibers 25. Micro-lenses 32 direct the optical beams into output optical fibers 25. Accordingly, optical signals carried on input optical fibers 20 may be selectively coupled to output optical fibers 25.

The present invention uses sense circuitry 40, shown schematically in FIG. 1, to sense capacitance between elements of micro-mirror arrangements 100-1 and 100-2. As discussed in greater detail below, capacitance values between a micro-mirror 122 and the micro-mirror's control electrodes are sensed and processed by sense circuitry 40 to determine a set of signals based on the sensed capacitance values. These signals are used to determine an angular position of a micro-mirror 122. Sense circuitry 40 may continually or periodically monitor capacitance of switch elements while a micro-mirror moves to provide feedback signals indicative of the mirror's actual measured angular position within a closed-loop control system, described in more detail below. Generally, a closed-loop control system compares a feedback signal with a desired signal (command signal) and uses a difference between them to automatically adjust one of the desired command signals. When used as feedback signals, processed capacitance sense signals allow for precise positioning control that dampens micro-mirror transient vibration and compensates for momentary or prolonged stochastic system perturbations. Feedback signals also may account for variations in system dynamics, such as changes in environmental conditions, manufacturing tolerances, wear of system mechanical components due to aging or repeated use, noncritical material failures, and errors due to calibration, installation and adjustments. Sense circuitry may also provide signals that can be used to determine a mirror position on demand, during a scanning mode, and/or in a testing mode of the switch.

A controller 50 may be provided that receives control inputs and generates output control signals to control the position of the micro-mirrors 122 of the first and second micro-mirror arrangements 100-1 and 100-2. Controller 50 may also receive feedback signals that are based on sensed capacitive signals. The controller 50 may be, for example, a computer or application-specific circuit. In one embodiment, separate control circuitry is provided with each movable micro-mirror, as described below. Sense circuitry 40 may be provided with controller circuitry on the mirror arrangements 100-1 and 100-2. Alternatively, sensing circuitry 40 may be provided separate from arrangements 100-1 and 100-2, and/or with the circuitry of controller 50. While the sense circuitry 40 and controller 50 are shown separately in the schematic of FIG. 1, it should be understood that this is for ease of explanation. The sense circuitry 40 and controller 50 may be integrated into a single control device. Alternatively, the functionality of the sense circuitry 40 and/or controller 50 may be distributed among multiple sensor and controller units.

Micro-mirrors 122 of the second micro-mirror arrangement 100-2 are preferably movable to permit a light beam received from any of the micro-mirrors 122 of the first arrangement 100-1 to be directed through a micro-lens 32 of second lens arrangement 35 to an output optical fiber 25. In one embodiment, each micro-mirror 122 of the second arrangement 100-2 corresponds to one micro-lens 32 of the second lens arrangement 35 and one output optical fiber 25.

Micro-mirror arrangements 100-1 and 100-2 can be controlled to redirect or switch the coupling of optical signals. For example, as shown in FIG. 1, movable micro-mirror 122-1 of arrangement 100-1 directs an optical signal to movable micro-mirror 122-(k+1) of arrangement 100-2. However, responsive to control signals, movable micro-mirror 122-1 of arrangement 100-1 may redirect the optical signal it receives from input optical fiber 20-1 to movable micro-mirror 122-2 of arrangement 100-2. Micro-mirror 122-2 may be controlled to receive the optical signal and provide it to optical fiber 25-2.

While FIG. 1 shows a one stage switching arrangement, one or more additional stages of micro-mirror arrangements may be interposed between micro-mirror arrangements 100-1 and 100-2 to form a multi-stage switching arrangement.

Figure 2:
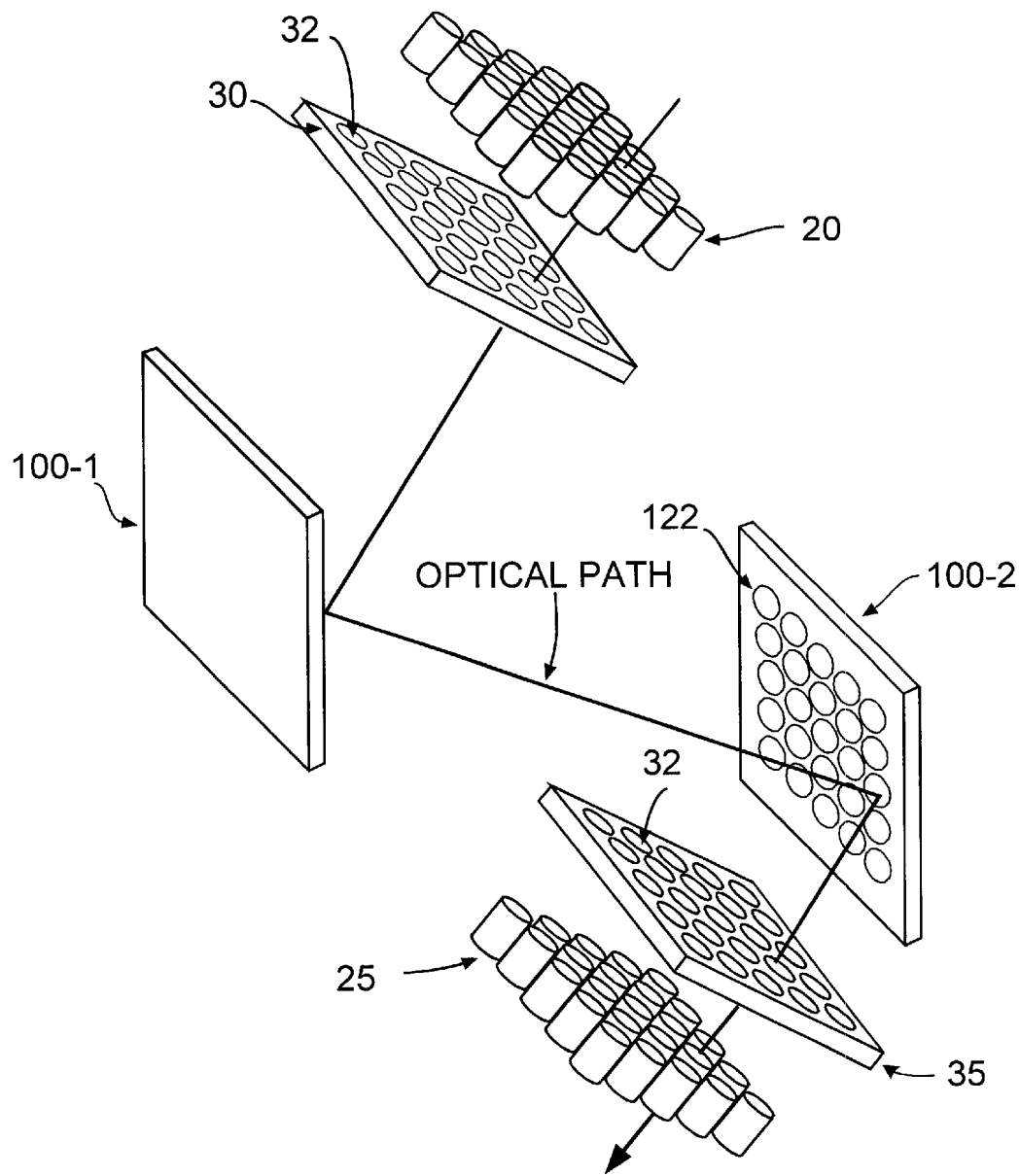
FIG. 2 provides an illustrative embodiment of an optical switch design using micro mirrors.

FIG. 2 shows an example of an embodiment using the steerable micro-mirror arrangement 10 schematically shown in FIG. 1. As shown in FIG. 2, input optical fibers 20 and output optical fibers 25 are arranged in two-dimensional arrays. While input optical fibers 20 and output optical fibers 25 are shown in a rectangular array, it is to be understood that input and output optical fibers may be arranged in any way that allows optical coupling of fibers 20, 25 to respective lenses 32. Similarly, lens arrangements 30 includes micro-lenses 32 arranged in arrays and each are preferably aligned with an input fiber 20 so that light signals from each input fiber 20 will pass through one of the micro-lenses 32. In this way, optical beams emitted from the input fibers 20 will pass through one of the micro-lenses 32 and be directed from the input fibers 20 to one of the micro-mirrors 122 of the first arrangement of micro-mirrors 101-1. The micro-mirror arrangements 100-1, 100-2 and lens arrangement 30, 35 may also be of the types disclosed in U.S. application Ser. No. 09/691,193, filed Oct. 19, 2000, which respectively incorporate radiation emitting and detecting elements, and is hereby incorporated by reference. Lens arrangement 35 also may include optical couplers or taps that can be fused with an output fiber 25 to draw a small portion of the optical power switched to an output fiber 25 for monitoring and feedback purposes, such as the types disclosed in U.S. application Ser. No. 09/756,675, filed Jan. 10, 2001. Lens arrangements 30 and 35 also may be a non-planar type arrangements, such as those disclosed in application Ser. No. 09/758,231, filed Jan. 12, 2001, and hereby incorporated by reference. Micro-mirror arrangements 100-1 and 100-2 may be the non-planar types, such as those disclosed in application Ser. No. 09/757,475, filed Jan. 11, 2001, and hereby incorporated by reference. The micro-mirrors 122 of the first and second arrangements 100-1, 100-2 are formed by micro-electromechanical system (MEMS) elements arranged in an array. The first MEMS arrangement 100-1 is positioned at an angle to lens array 30 and generally faces the second MEMS arrangement 100-2 with some offset. The second MEMS array 100-2 is positioned at an angle to the second lens array 35. Accordingly, an optical path from an input fiber to an output fiber traverses a generally "Z" shaped path, as illustrated in FIG. 2.

As shown in FIG. 2 with a single optical beam, the first lens array 30 receives the input optical beam from the input optical fibers 20 at a micro-lens 32 and directs the input beam to a movable micro-mirror 122 of the first MEMS arrangement 100-1. Depending on the angular position of the movable micro-mirror 122, the input optical beam is reflected to a selected movable micro-mirror 122 of the second MEMS arrangement 100-2. The movable micro-mirror 122 of the second MEMS arrangement 100-2 reflects the input optical beam through a lens 32 of the second lens array 35 to a selected one of the output optical fibers 25. Thus, the optical beam passes out of the input optical fiber, passes through a lens 32 of the first lens array 30, is reflected by the first and second MEMS arrangements 100-1, 100-2, passes through a lens 32 of the second lens array 30, and is directed into a selected output optical fiber 25.

Figure 3A:
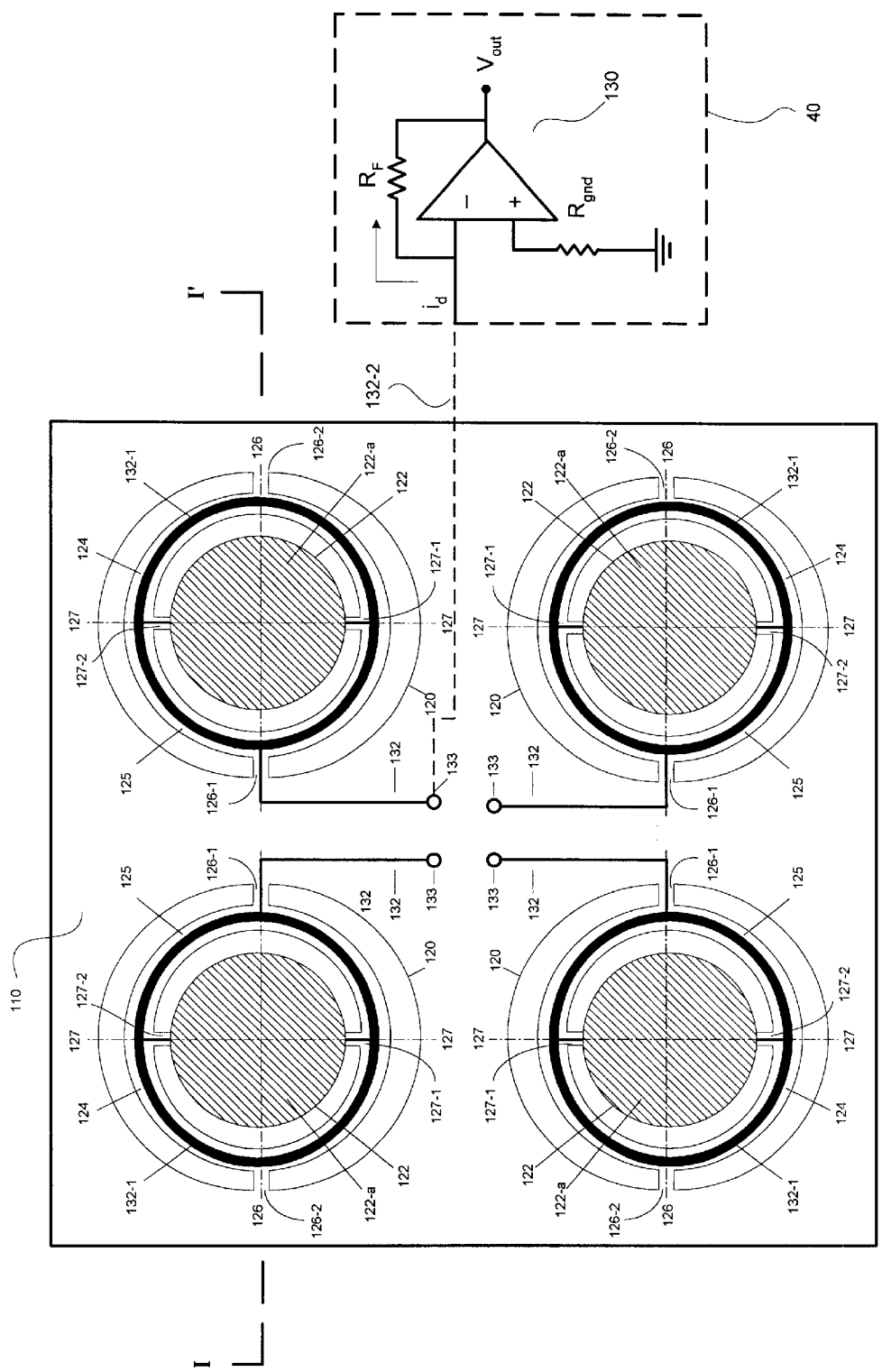
FIG. 3a provides a top view of an illustrative optical switch that includes a first exemplary sidewall electrode arrangement in accordance with the present invention.
Figure 3B:
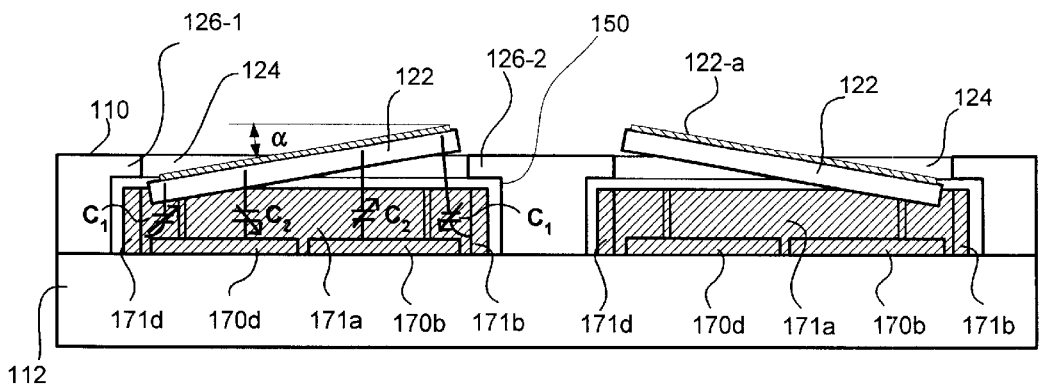
FIG. 3b provides a cross-sectional view of FIG. 3a taken along line I–I'.
Figure 3C:
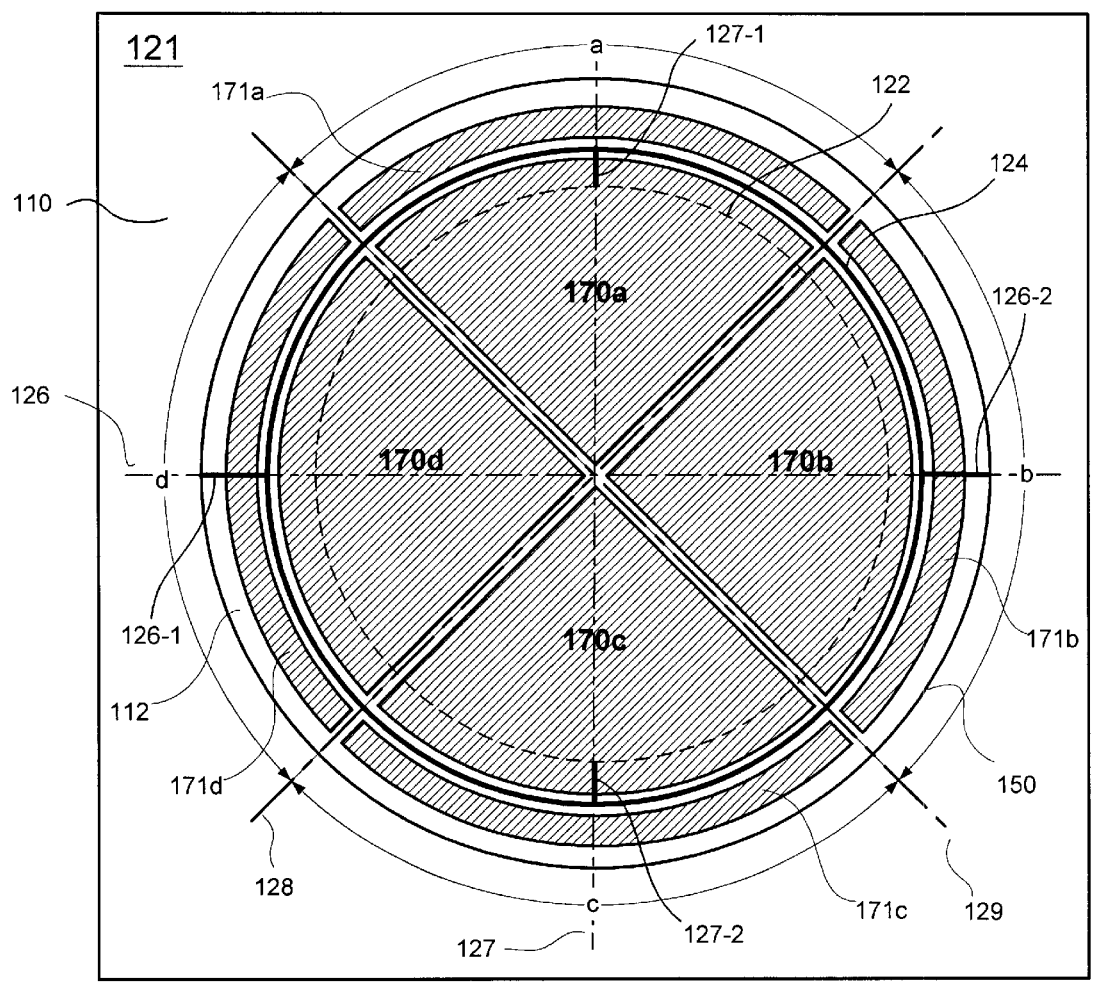

FIGS. 3a to 3c illustrate top and cross-sectional views of an exemplary MEMS micro-Mirror arrangement using a first sidewall electrode layout in accordance with the present invention. For example, the MEMS micro-mirror arrangement exemplified by FIGS. 3a to 3c may form part of a MEMS micro-mirror arrangement 100, such as shown in FIG. 2. FIG. 3b represents a cross-section of the MEMS micro-mirror arrangement taken along axis I–I' of FIG. 3a. FIG. 3c is a plan view intended to provide a simplified rendering of the bottom portion of the MEMS micro-mirror arrangement shown in FIG. 3b.

The MEMS micro-mirror arrangement 100 may be formed using MEMS technology. Of course, this is exemplary and other technologies may be used consistent with the present invention. The arrangement 100 includes a substrate 110, which may be formed, for example, of single crystalline silicon, on which a plurality of micro-mirrors is formed in an array. FIG. 3a shows four micro-mirrors in a rectangular array for purposes of explanation. It should be understood that substrate 110 may include any number of micro-mirrors (one or more) and that the micro-mirrors may be arranged in any way. More particularly, the substrate 110 includes a plurality of micro-mirrors 122 and corresponding mirror mounts 124 for mounting the micro-mirrors 122. The micro-mirrors 122 may be formed with a conductive coating, such as gold, to form conductive mirror plate 122-a and provide a reflective surface. Each micro-mirror 122 and corresponding mirror mount 124 form a movable micro-mirror unit 120. FIG. 3a shows four movable micro-mirror units 120 for purposes of illustration. Of course, the micro-mirror arrangement 100 may have more or fewer than four movable micro-mirror units 120.

FIGS. 3a–3c show rectangular mirror cells 121, each including a micro-mirror unit 120, for purposes of illustration. However, a micro-mirror cell 121 may assume other shapes, such as Circular, triangular or hexagonal shapes, such as the types disclosed in application Ser. No. 09/754,260, filed Jan. 5, 2001, and hereby incorporated by reference. Micro-mirrors also may be formed into groups including two or more cells 121. In an arrangement having grouped cells, micro-mirror cells 121 may be arranged adjacent to one another, in a non-adjacent arrangement, or in an arrangement having a combination of adjacent and non-adjacent cells 121.

As shown in FIG. 3a, each mirror mount 124 may be formed as a gimbal. In particular, the mirror mount 124 includes a mounting arm 125 coupled to the remainder of the substrate 110 by pivot arms 126-1, 126-2 and coupled to the micro-mirror 122 by pivot arms 127-1, 127-2. Pivot arms 126-1 and 126-2 enable the mounting arm 125, and thus the micro-mirror 122, to pivot with respect to the substrate 110 about a first axis 126. Pivot arms 127-1 and 127-2 enable the micro-mirror 122 to pivot with respect to the mounting arm 125 about a second axis 127 orthogonal to the first axis 126. Pivot arms 126-1, 126-2, 127-1, 127-2 maybe formed as torsional elements, such as serpentine springs or other elastic/pivoting devices that provide resistance and restoration forces to micro-mirror 122. FIG. 3a shows the mounting arm 125 to be circular for purposes of illustration and not by way of limitation. Of course, the mounting arm 125 may be, for example, rectangular, elliptical, or other closed loop shape, or U-shaped, or arcuate.

The micro-mirror arrangement 100 further includes a sub-mount 112 beneath the substrate 110. The sub-mount 112 may be formed, for example, of silicon or another semiconductor material or compound, or an insulative material on which a semiconductive material or compound may be formed. Micro-mirror arrangement 100 may optionally include a spacer layer (not shown) that separates the sub-mount 112 from substrate 110. In such an arrangement, sub-mount 112 can be silicon, ceramic, epoxy, polyimide, an oxide or other like materials, and the spacer layer can be silicon, ceramic, epoxy, polyimide, an oxide or other like materials. In addition, the spacer can be omitted and mesa-like extensions of the sub-mount 112 (not shown) can be used to support a plurality of substrates 110.

FIG. 3c provides a top view of one mirror cell 121. Similar to FIGS. 3a and 3b, FIG. 3c is intended to provide a simplified rendering of the arrangement of control and/or sense electrodes 170 and 171 on sub-mount 112 for purposes of explaining the invention. Outlines of mirror mount 124 and micro-mirror 122 are schematically shown to clarify the arrangement.

As shown in FIG. 3c, sub-mount 112 includes a plurality of electrodes 170, 171 arranged in groups corresponding to the movable micro-mirror assemblies 120 and, in particular, to the micro-mirror 122 and mounting arm 125 of the movable micro-mirror units 120. Each of the electrode groups is located in within cavities (mirror wells) 150 defined by substrate 110 and sub-mount 112. As shown in FIG. 3c, each mirror well may include four mirror quadrants a, b, c, and d that are defined by electrode axes 128 and 129. While electrode axes 128 are illustrated as being offset from axes 126 and 127, it is to be understood that the electrode axes may be respectively aligned with axes 126 and 127.

Electrodes 170 are provided on a bottom surface of mirror well 150 and underlie a micro-mirror 122. Sidewall electrodes 171 are formed in segmented portions and along the wall of well 150 to substantially surround electrodes 170 and also are positioned at a periphery of micro-mirror 122. Electrodes 171 may extend vertically to substantially the height of the well or to a lesser height. For example, FIG. 3b shows an exemplary "head-less" sidewall electrode structure that includes a group of sidewall electrodes 171 having a top surface recessed below the bottom of the mirror (i.e., the non biased horizontal position). The head-less structure can provide an increase in torque and linearity (of capacitance and torque vs. mirror angle) with lower parasitic capacitance, and lower drive voltages compared with electrodes at substantially the same height as the mirror. Electrodes 170 are positioned under micro-mirror 122 and may have a major plane substantially parallel with an upper surface of sub-mount 112. It is to be understood that major surfaces of electrodes 170 may not be planar or flat with respect to a surface of sub-mount 112. For example, electrodes 170 may be positioned at an angle with respect to an upper surface of sub-mount 112, or include segmented portions positioned at different relative heights relative to one another. Electrodes 170, 171 act on the micro-mirror 122 and mounting arm 125 to control the angular position of the micro-mirror 122 by electrostatic force. In the embodiment of FIG. 3c, electrodes of quadrant a and quadrant c control the angular position of the micro-mirror 122 about axis 126. Electrodes of quadrant b and quadrant d control the angular position of the micro-mirror 122 about axis 127. Consequently, by appropriate control of electrodes 170a–170d and 171a–171d, the surface angle of micro-mirror 122 may be controlled. Accordingly, micro-mirror 122 can be used to steer an incident light beam to a particular location, a function useful in optical switches.

Control circuitry 50 for driving electrodes 170 and 171, as well as sensing circuitry 40 for sensing a micro-mirror's capacitance, may employ analog and/or digital designs. The control and sensing circuitry may be integrated into or on the sub-mount, provided by one or more separate driver chips, or provided by any combination of the foregoing. Control circuitry 50 may be coupled to electrodes 170/171 using conductive traces or wires provided on sub-mount 112 and/or conductive vias formed in the sub-mount 112, or other conductive paths.

Mirror 122 is actuated by an electrostatic force field that exists between conductive portions of mirror 122 and the arrangement of mirror control and/or sense electrodes 170, and/or vertically elongated arrangement of control and/or sense sidewall electrodes 171, when position control voltages are applied to 171 and/or electrodes 170. The electrostatic force field results from positive (negative) charges that accumulate on the control/sense electrodes 170 and/or 171 upon applying position control voltages. Positive (negative) charges on electrodes 170 and/or 171 induce negative (positive) charges in nearby conductive portions of micro-mirror 122. According to Coulomb's law, a force between a first and second object having quantities of charge Q1 and Q2, respectively, is proportional to each of the charges Q1 and Q2 and inversely proportional to the square of the distance between them. Hence, when an induced charge exists in a conductive portion of mirror 122 by a voltage applied to electrodes 170 and/or 171, an attractive force will act on the mirror 122 (using electrodes 170 and/or 171 as a reference point). However, since axes 126 and 127 support mirror 122, this attractive force may cause rotation of mirror 122 about one or both of axes 126 and 127, and thus provide torque to mirror 122 about these axes.

Since the attractive force on micro-mirror 122 is proportional to an electric field between an electrode 170 or 171 and an associated micro-mirror conductive portion, electric fields existing between electrodes 170 and/or electrodes 171 and the conductive portion of micro-mirror 122 supply torque on the mirror about mirror axes 126 and/or 127, and thus move micro-mirror 122 into an angular position. In each electrode quadrant a to d, electrodes 170 and sidewall electrodes 171 may be driven with control voltages simultaneously, independently, or in a cooperative fashion to provide electric fields that angularly position a micro-mirror 122.

Micro-mirror electrodes 170 may also be biased to control the height (i.e. in the z-axis) of the mirror 122 in addition to applying control voltages that move a micro-mirror and/or sense signals. A DC bias to all four electrodes 170a–170d can make the top surface of the mirror 122 rise slightly above or sink slightly below the top surface of substrate 110, with the direction of movement depending on the polarity of the DC biasing. Micro-mirror 122 also may be provided a biasing voltage in conjunction with bias voltages applied to electrodes 170. For a more detailed description of micro-mirror biasing structures and methods, see copending application Ser. No. 09/756,672, filed Jan. 10, 2001, the entire contents of which are hereby incorporated by reference.

With reference to FIGS. 3b, the capacitance-sensing feature of the present invention is now described. As shown in FIG. 3b, capacitance $C_1$ is present across any sidewall electrode 171 and an associated conductive portion of micro-mirror 122 at any angular position of micro-mirror 122. Similarly, a capacitance $C_2$ is present across any planar electrode 170 and an associated conductive portion of micro-mirror 122 at any angular position of the mirror. Capacitances $C_1$ and $C_2$ each may be defined the ratio of the magnitude of the total charge Q on a mirror electrode 170 or 171 and respective conductive portions of micro-mirror 122, to the potential difference V between them (Q/V). In general terms of electric field E, a capacitance C also may be defined as:

$$C = \frac{\oint_S \epsilon E \cdot dS}{-\int E \cdot dL}$$

where $\epsilon$ is the permittivity of the dielectric separating mirror electrodes 170, 171 and micro-mirror 122, the numerator is Gauss's law (a closed surface integral relating charge Q enclosed in a surface to the total electric flux passing through the surface), and the denominator a line integral of the electric field and representing the potential difference V (i.e., the work done by moving a unit positive charge along a path L from one point to another in electric field E). Resulting capacitances $C_1$ and $C_2$ are functions only of the physical dimensions of conductors 170, 171 and conductive portions of micro-mirror 122. A varying distance between these conductors varies $C_1$ and $C_2$ as micro-mirror 122 moves through angular displacement.

Each micro-mirror 122 preferably includes one or more associated conductive portions that may form a node in a circuit that senses capacitance between electrodes 170 and/or 171 and a mirror conductive portion. For example, a reflective mirror plate 122-a of micro-mirror 122 may be formed from material that is both conductive and reflective, such as gold. Alternatively or in combination with a reflective and conductive surface, each micro-mirror 122 may include conductive portions located about the moveable micro-mirror and electrically coupled to the micro-mirror reflective material, or formed separate from the micro-mirror material. For example, mounting arm 125 and/or the rim of mirror 122 may be coated with a same conductive material used to form mirror plate 122-a. Alternatively or in combination with a conductive mirror plate, mounting arm 125 and/or the rim of mirror 122 may be formed to include a conductive material different from material forming the mirror plate, such as aluminum or n-type or p-type conductivity semiconductor material.

To sense capacitances $C_1$ and/or $C_2$, electrodes 170 and/or 171 may be driven with AC carrier signals in addition to driving them with position voltages that provide torque to mirror 122. A capacitance measurement of $C_1$ and/or $C_2$ can be made by superimposing an AC carrier signal onto a command (drive) signal applied to at least one of the micro-mirror electrodes 170 and 171. Sense circuitry 40 senses a resulting displacement current across a capacitance formed by electrodes 170 and/or 171 and a conductive portion of micro-mirror 122. The AC carrier signal frequency may be selected at an appropriate frequency interval from the natural frequency of the mirror system to suppress or prevent mirror oscillations that would otherwise affect optical switch performance. By utilizing sensed displacement currents across a plurality of conductive mirror electrodes associated with a micro-mirror and the micro-mirror 122, the micro-mirror's angular position may be precisely determined.

As described above and shown in FIG. 3$a$, each mirror may include a sensing circuit 40. Each sensing circuit 40 may include a device to convert a sensed capacitance displacement current signal $i_d$ to a voltage signal. Additional circuitry that may be included with sensing circuit 40 for processing the sensed signal is described in more detail below. Devices within sensing circuit 40 may include an operational amplifier, such as a transimpedance amplifier, that is coupled to mirror plate 122-$a$ and/or other conductive portions of the mirror to sense a displacement current resulting from the superimposed carrier signals. In FIG. 3$a$, a sensing circuit 40 is shown that includes a transimpedance amplifier 130 coupled via wiring 132 to micro-mirror plate 122-$a$. An AC signal superimposed on a position drive signal applied to mirror electrodes 170 and/or 171 causes a displacement current $i_d$ to flow towards the virtual ground of the transimpedance amplifier inverting input, and then into the amplifier feedback electrode $R_F$ to provide a sense voltage $V_{out}$. Wiring 132 may be connected to a via 133 that passes through substrate 110 to areas within sub-mount 112 containing sensing circuit 40 or to other areas of optical switch 10. Portions or all of sensing circuit 40 may be formed on or in substrate 110 in space adjacent mirrors 122 to shorten a length of wiring 132, and thus reduce parasitic inductive and/or capacitance effects. Wiring 132 may be coupled to sensing circuit 40 using wire bonding, lead-on-chip (LOC), wiring or metallization on the periphery of arrangements 100-1 and 100-2, or other suitable techniques. Conductors other than metallization, such as conductively doped regions in mounts 124, may be used to couple mirrors 122 to sensing circuits 40. As shown in FIG. 3$a$, wiring 132 also may optionally include a wiring portion 132-1 provided around mirror mount 124. Wiring 132-1 may interact with electrodes 170 and/or 171 to provide additional torque and/or capacitance to the mirror structure.

Outside an area in proximity of mount 124, wire 132 is shown as a dotted line 132-2 to conceptually show how it couples micro-mirror 122 to sensing circuit 40. Sensing circuit 40 is shown as including a transimpedance amplifier 130 with a resistive feedback $R_F$, but it may include an amplifier with resistive and/or capacitive feedback and/or additional amplifying stages and/or filters cascaded with amplifier 130, or other capacitance sensing circuitry known in the art. For example, one or more additional operational amplifiers may be provided in a further stage of sensing amplifier 130 to adjust any offset or gain of the transimpedance amplifier, and/or to provide proper voltage output to digital signal processing (DSP) components. As described above, sensing circuit 40 may be provided on mirror arrangements 100-1 and 100-2, on a chip attached to, or separate from mirror arrangements 100-1 and 100-2, with circuitry of controller 50, or any combination of the foregoing.

Each micro-mirror electrode 122 may be held at virtual ground by coupling each mirror 122 to an inverting input of a transimpedance amplifier, such as transimpedance amplifier 130 described above, or other virtual ground circuitry. In tight mirror packing densities, occurrences of crosstalk between neighboring mirrors may increase due to stray capacitance signals picked up by an adjacent micro-mirror's sensing carrier signals. Forcing each mirror to assume a virtual ground helps to suppress stray signals from affecting adjacent mirrors, and thus may reduce occurrences of inter-mirror crosstalk that might otherwise cause inaccurate position sensing.

In a method of driving a micro-mirror according to the present invention, planar electrodes 170 and sidewall electrodes 171 are used to drive micro-mirror 122 into position and to sense the mirror's position. Micro-mirror 122 may take on any angular position within an operating range determined by switch geometry and/or an applied z-axis bias, as described above. FIG. 3$b$ illustrates micro-mirror 122 at an angle $\alpha$ from a horizontal axis. Using an electrode quadrant as a reference for purposes of illustration, an exemplary mirror angular operating range may be $-\alpha_{max} \leq \alpha \leq \alpha_{max}$. In the middle of this exemplary operating angular range, e.g., when $\alpha=0$, the upper plane of micro-mirror 122 is in a horizontal position. At one extreme of this exemplary range, e.g., when $\alpha=\alpha_{max}$, micro-mirror 122 is in close proximity of an electrode 170 in the reference quadrant. At the other extreme, micro-mirror 122 is in close proximity of an electrode 170 in a quadrant opposite the reference electrode quadrant and is primarily controlled by that electrode group, i.e., the opposite quadrant primarily controls the angles $-\alpha_{max} \leq \alpha \leq 0$ of the operating range. Thus, for purposes of conceptualizing the present invention, the effective range using a single quadrant as a reference is $0 \leq \alpha \leq \alpha_{max}$. To position micro-mirror 122 at a desired angle $\alpha$ within effective angular operating range $0 \leq \alpha \leq \alpha_{max}$, sidewall electrodes 171 may be driven in conjunction with electrodes 170 move micro-mirror 122.

To position micro-mirror 122 at a desired angle $\alpha$ within its angular operating range, electrodes 170 and 171 may be separately or commonly controlled. Separate control is beneficial for mirror angles close to $\alpha_{max}$ because the electric field intensity between the micro-mirror 122 and electrode 170 is inversely proportional to the square of the distance of micro-mirror 122 from an electrode. By separately controlling electrodes 170 and 171, the nonlinear effects resulting from the inverse square field may be eased. For example, an angular operating range may include a subset of angles that are controlled solely by using sidewall electrodes 171. Other desired micro-mirror angles within the operating range, but outside and larger than the subset exclusively controlled by sidewall electrodes 171 may be achieved by applying drive voltages to a combination of sidewall electrodes 171 and planar electrodes 170.

Shaping quadrant electrode drive signals that move micro-mirror 122 from one angular position to another may enhance transient vibration and/or oscillation control. When step-like rive signals applied to electrodes 170 cause mirror 122 to respond in a step-like fashion, the Fourier components of the step wave are boosted by the natural frequency $f_o$ of the system and cause the system to appear as oscillating. Mirror drive signals shaped to reduce amplitudes of the drive signal's Fourier components by an amount proportional to corresponding Fourier components of the mirror's response that are boosted by the system's $f_o$ can reduce mirror trajectory overshoot and/or mirror settle time. Of course, pulse shaping may be used in closed or open loop control systems.

As described above, electrodes 170 and 171 also may be additionally driven to sense capacitance. A signal pair $V_{cx}$ and $V_{cy}$, corresponding to an actual micro-mirror angular position, may be generated by differentially sensing respective capacitance values diagonally across two electrode pairs of an arrangement of mirror electrodes 170/171 using a switched capacitor sensing circuit. Carrier sensing signals applied across the two diagonal pairs may be switched for sequential measurement of each pair. Alternatively, a measurement of both diagonal pairs may be taken simultaneously. For example, in the electrode arrangement of FIG. 3c, a simultaneous measurement may be taken across a diagonal including horizontally opposed electrodes 170b/171b and 170d/171d and a diagonal including vertically opposed electrodes 170a/171a and 170d/171d. The resulting displacement current $i_d$ from each diagonal pair may be converted to a voltage signal using conventional devices, such as the amplifier 130 described above. Of course, as will be evident from the description below, arrangements other than differential capacitance sensing methods, or to taking diagonal measurements, may be used consistent with the present invention.

Figure 4:
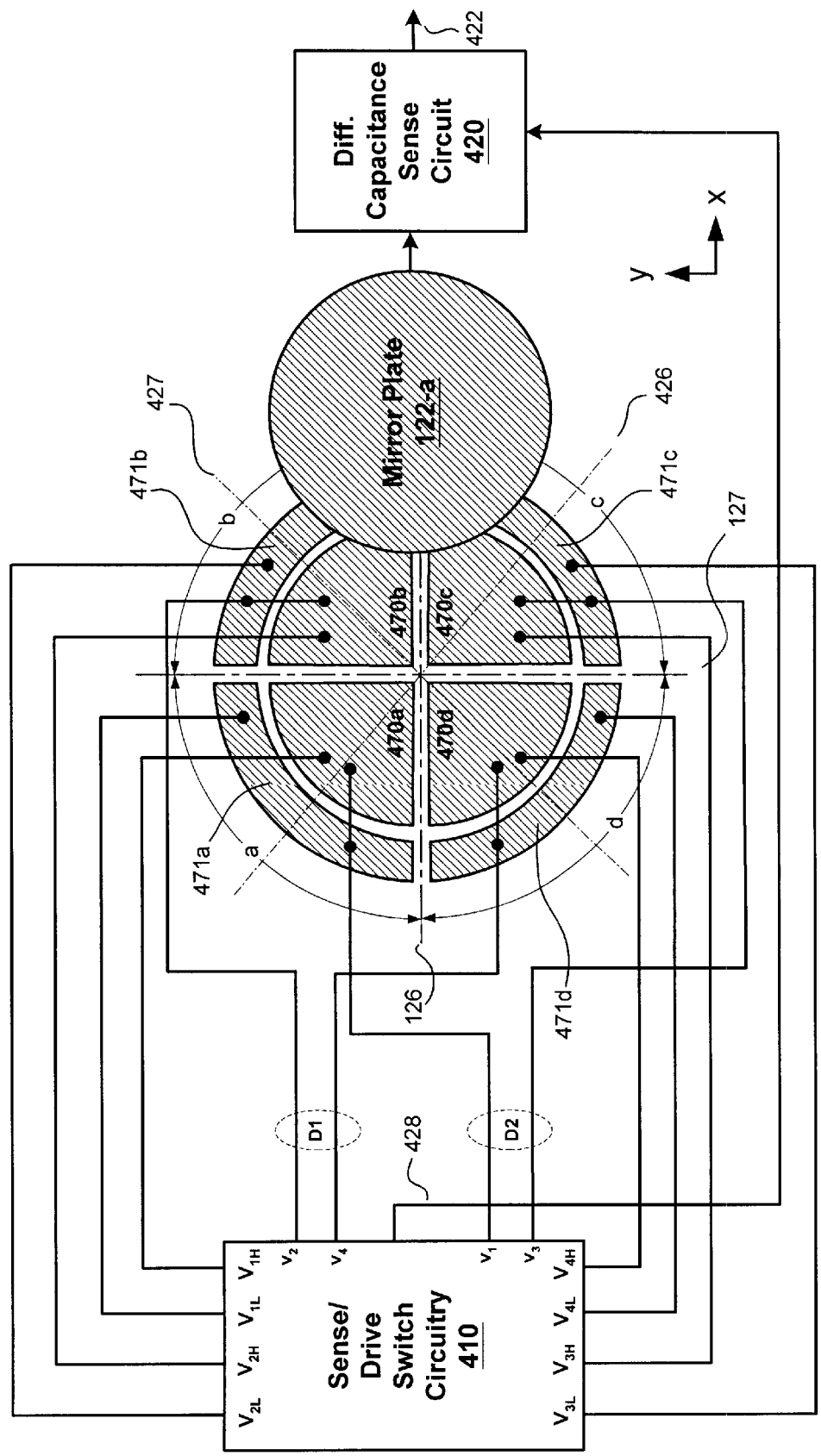
FIG. 4 is a schematic illustrating an exemplary first circuit arrangement for sensing a capacitance signal in accordance with the present invention.

In a first exemplary method of the present invention for sensing capacitance in a micro-mirror unit, FIG. 4 conceptually illustrates how differential capacitance measurements on diagonal pairs of four electrodes 470 and four sidewall electrodes 471 may be used to determine signals representing a micro-mirror's actual position. It should be appreciated that each electrode quadrant may include more than one electrode 470 and/or more than one sidewall electrode, as exemplified by further embodiments described below. Mirror electrodes 470a to 470d and 471a to 471d are arranged into the quadrature configuration described above. Drive signals 1 to 4 for each respective quadrant a to d are shown as including separate control voltages L (low α angle values) and H (high α angle values) to illustrate micro-mirror position control that uses the cooperative method described above. The separately controlled mirror electrodes 470 and 471 illustrated in FIG. 4 are exemplary. For example, in each quadrant a to d, electrodes 470 and 471 may be commonly driven using a single voltage signal. Orthogonal pivoting axes 126 (along a direction x) and 127 (along a direction y), such as pivoting gimbal axes described above, that overlie electrodes 470a to 470d are shown in FIG. 4 to conceptually illustrate a method for determining signal pair $V_{cx}$ and $V_{cy}$. It is to be understood that while the axes 126 and 127 are shown as coinciding with the orthogonal axes separating mirror electrodes 470 and 471, an offset configuration such as shown in FIGS. 3a–3c may be used. Signal pair $V_{cx}$ and $V_{cy}$ is used to determine mirror position and/or used in a feedback loop of the micro-mirror's control circuitry to modify control output signals generated from input command parameters, i.e., the desired set points.

FIG. 4 shows sense/drive switching circuitry 410 that may include analog and/or digital circuitry provided on arrangements 100-1 and 100-2, and/or provided separately as described above. Circuitry 410 may be integrated into a single circuit as shown schematically in FIG. 4 or provided in separate areas of the MEMS chip. Circuitry 410 provides drive signals $V_{1L}, V_{1H}, \ldots, V_{4L}, V_{4H}$ to respective mirror electrodes 470a, 471a, . . . , 470d, 471d for positioning a micro-mirror 122. Circuitry 410 also includes drivers that provide carrier signals $V_1$–$V_4$ to respective mirror electrodes 470a/471a, 470b/471b, 470c/471c, and 470d/471d for sensing a differential capacitance between opposing mirror electrode pairs along diagonals 426 (D1) and 427 (D2). The four carrier signals $V_1$–$V_4$ may be used in a method including simultaneous capacitance sensing across diagonal quadrants, however, sensing may include only two carrier signals in a method that periodically switches capacitance sensing between the two diagonals D1 and D2.

While FIG. 4 shows mirror drive signals for positioning and carrier signals for capacitance sensing respectively applied to the same mirror electrode 470, it is to be understood that in the present invention each electrode 470 may include separate driving and sensing portions, may be used exclusively for sensing capacitance, or that separate capacitance sensing electrodes may be provided elsewhere in a micro-mirror unit or cell. For example, in each quadrant, electrode 470 may be segmented into two or more pie-shaped portions where some pie-shaped portions are reserved for position sensing and the other portions are reserved for driving the mirror. Alternatively, electrodes 470 may each include an inner pie-shaped driving and/or sensing portion and one or more outer driving and/or sensing portions in the shape of quarter-rings.

As shown in FIG. 4, micro-mirror 122 includes a conductive mirror plate 122a that forms a node from which a displacement current is sensed. Although not shown in FIG. 4, the mirror mount supporting mirror plate 122-a also may include additional conductive portions that sense capacitance. Displacement current flows between mirror plate 122-a and electrodes 170 and/or 171 when AC carrier signals are applied to a diagonal mirror electrode pair. A capacitance sense circuit 420 senses the displacement current resulting from a differential capacitance present across a diagonal mirror electrode pair and converts the differential displacement current sensed into a differential voltage measurement. The differential voltage output 422 from circuit 420, i.e., $V_{c1}$–$V_{c3}$ from electrodes 470a, 471a, 470c, and 471c, and $V_{c2}$–$V_{c4}$ from mirror electrodes 470b, 471b, 470d and 471d, may be used to determine signal pair $V_{cx}$ and $V_{cy}$ as follows:

$$V_{cx}=V_{c3}+V_{c4}-V_{c1}-V_{c2}=-(V_{c1}-V_{c3})+(V_{c4}-V_{c2}) \qquad (1)$$

$$V_{cy}=V_{c2}+V_{c3}-V_{c1}-V_{c4}=-(V_{c1}-V_{c3})-(V_{c4}-V_{c2}) \qquad (2)$$

where $V_{c1}$ to $V_{c4}$ correspond to voltages generated by a capacitance sensing circuit 420 according to displacement current $i_d$ from respective mirror electrodes 470a to 470d and/or 471a to 471d. Demodulator and mixer circuits, such as the types disclosed in application Ser. No. 09/756,675, filed Jan. 10, 2001, and incorporated by reference, may be coupled with output 422 to process the differential voltage pairs $(V_{c1}-V_{c3})$ and $(V_{c4}31\ V_{c2})$ in accordance with (1) and (2) to generate position/feedback output signal pair $V_{cx}$ and $V_{cy}$. Output $V_{cx}$ and $V_{cy}$ also may be fed out of the switch for monitoring purposes that include diagnostic test modes and/or scanning modes.

Figure 5A:
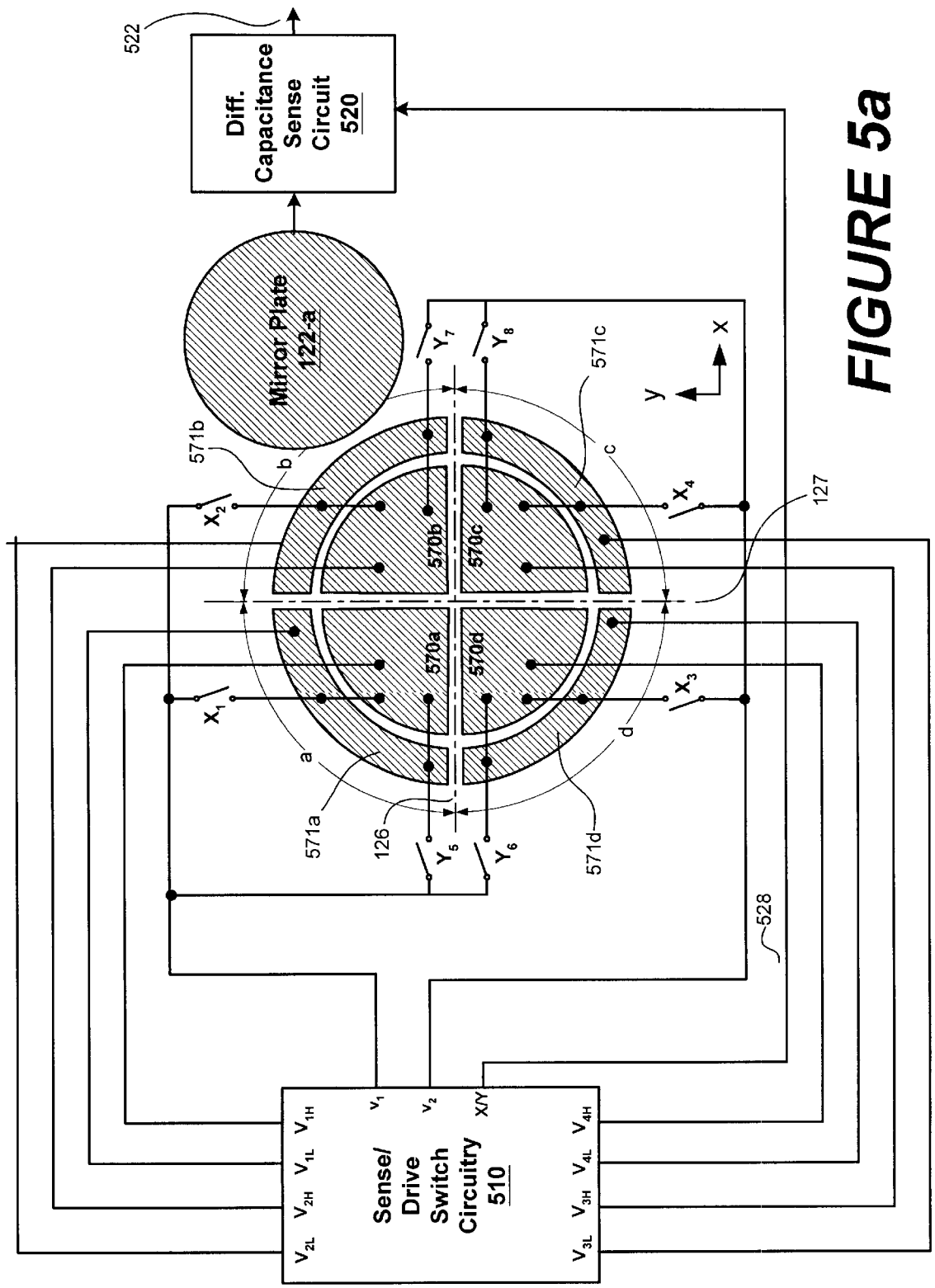
FIG. 5a schematic illustrating an exemplary second circuit arrangement for sensing a capacitance signal in accordance with the present invention.

FIG. 5a shows an alternative method of sensing differential capacitance across electrodes 570 and or sidewall electrodes 571. As conceptually shown in FIG. 5a, a tip about the x-axis can be determined in a first instance of time by sensing a capacitance across a first combination of mirror electrodes that includes electrodes 570a and 570b commonly driven with sidewall electrodes 571a and 571b, and a second combination of mirror electrodes that includes electrodes 570c and 570d commonly driven with sidewall electrodes 571c and 571d. This may be realized by opening switches $Y_5$–$Y_8$, such as single pole single throw (SPST) switches, while closing switches $X_1$–$X_4$ and applying the AC carrier signal across the electrode pair 570a /570b/571a/ 571b and 570c/570d/571c/571d, i.e., "hemi-circle" coupling across the upper and lower electrode quadrants. At another instance of time, a tip about the y-axis may be determined by closing switches $Y_5$–$Y_8$ and simultaneously opening switches $X_1$–$X_4$ to sense a capacitance across a third combination of mirror electrodes that includes electrodes 570a, 570d, 571a, and 570d, and a fourth combination of mirror electrodes that includes electrodes 570b, 570c, 571b, and 570c, i.e., hemi-circle coupling across the left and right hand electrode quadrant pairs.

Figure 5B:
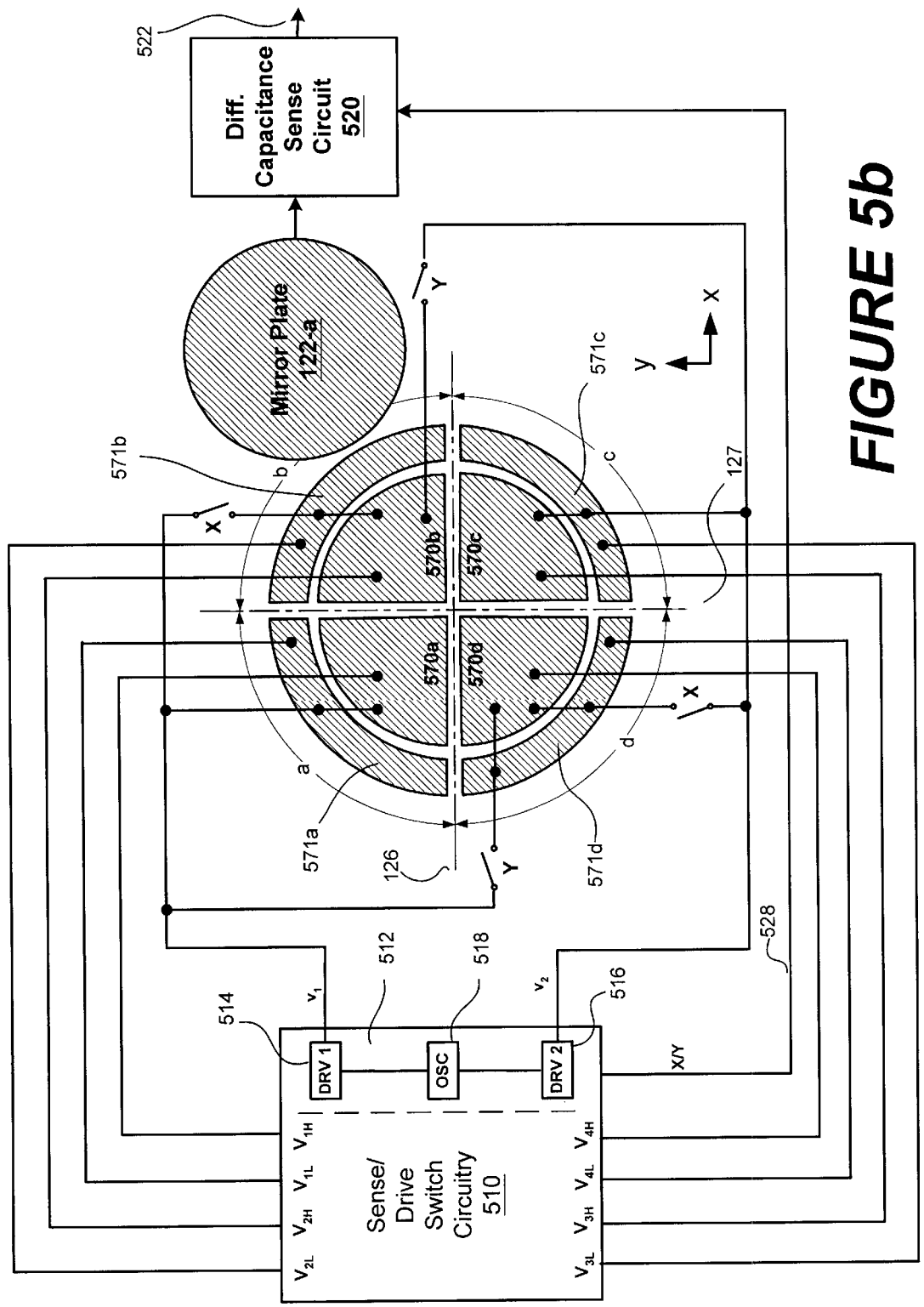
FIG. 5b illustrates a third exemplary sense circuit and method for measuring a sensed capacitance in accordance with the second exemplary method of the present invention.
Figure 5C:
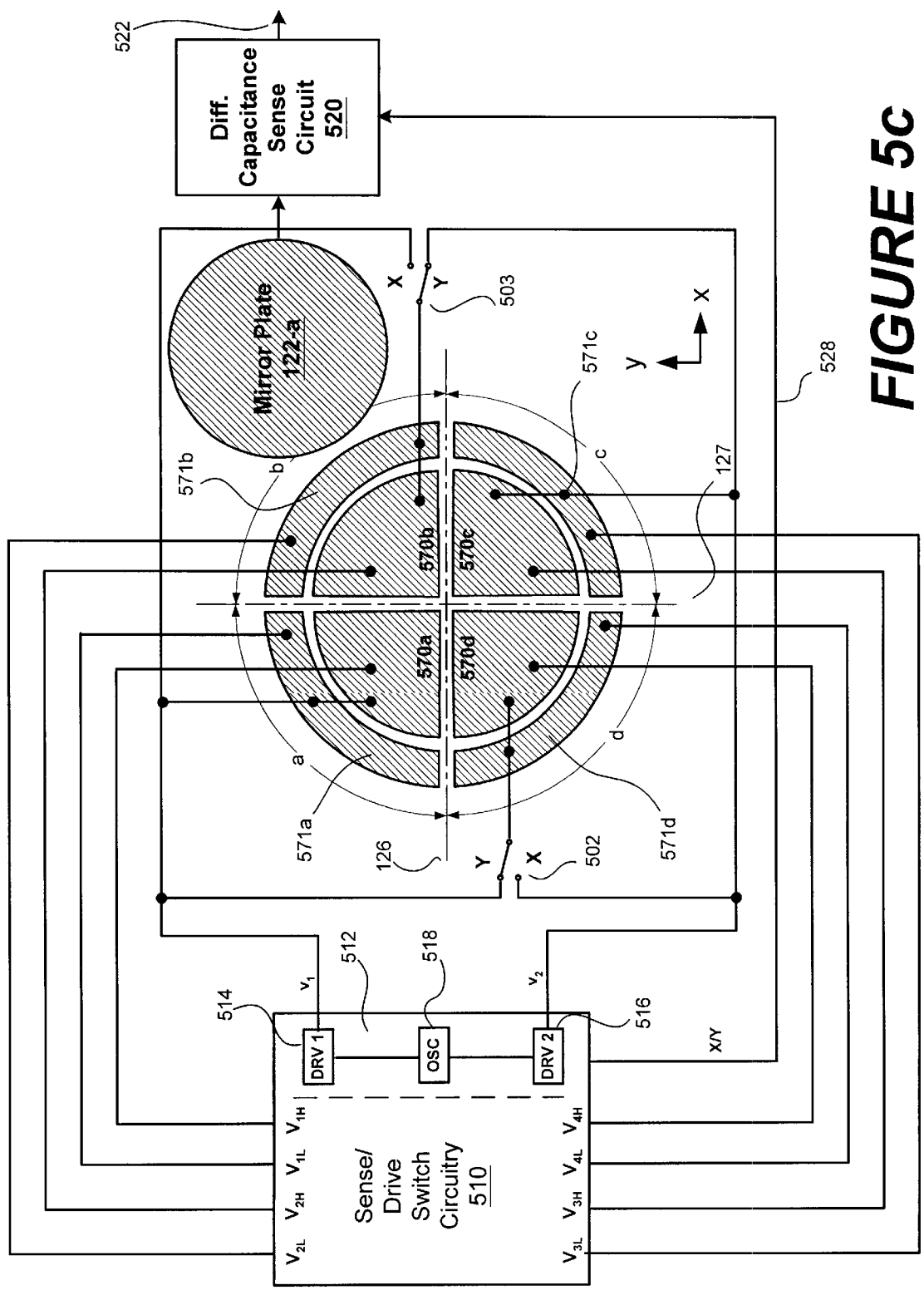
FIG. 5c illustrates a fourth exemplary circuit arrangement for sensing a capacitance in accordance with the present invention.

It is to be understood that the term "hemi-circle" is used herein for conceptual and descriptive purposes. While the electrode configuration of the present invention may generally be a circular shape, other electrode shapes may be used that are not circular, such as the segmented pie-shape electrodes described above, triangles or other polygons, and of the foregoing with rounded corners, or other complex shapes. Sensing electrodes also may be asymmetrically shaped about one or both mirror axes. For example, known electrode variations that produce substantially linear sensed response may be compensated for with additional circuitry, such as an amplifier having an appropriate gain for adjusting an amplitude of a sensed signal. Known digital signal processing techniques may account for electrode variations in substantially linear as well as non-linear sensed readout. Additionally, the switches described below and shown in FIGS. 5b and 5c are shown in simple form for conceptual purposes. Actual switching circuitry may be provided using conventional CMOS FET technology or other switching technology. The carrier signal injection point may be provided in switching circuitry that is integrated with mirror position drive circuitry, such as in a CMOS mirror drive switching circuit. Carrier signals also may be provided exclusively to one or more electrodes in a segmented configuration of quadrant electrodes 570 and 571, or provided to a combination of all electrodes in a quadrant. For example, each quadrant electrode 570 may include 2 or more pie shaped and/or ring-shaped segments with one or more segments reserved for sensing and others reserved for driving mirror position.

The present invention is not limited to electrodes having pie or ring shapes, or to electrode quadrants having only one sidewall electrode. For example, an electrode quadrant may include an electrode 570 having several concentrically arranged and segmented portions that are driven in combinations that may include one electrode segment or several electrode segments controlled as a group for attaining a particular micro-mirror angle α. Alternatively, or in combination with the segments 570, more than one sidewall electrode may be arranged around electrode 570. A mirror angle α may be realized using combinations of segments and/or sidewalls. Electrodes in a combination may be driven using common or different voltages, thus allowing flexibility in designing an operating range. Sensing may be similarly performed using any combination of electrodes 570 or 571, or by using predetermined segments or sidewalls exclusively for capacitance sensing.

Positioning signals $V_{1L}$, $V_{1H}$, ..., $V_{4L}$, $V_{4H}$ are supplied from sense/drive switch circuitry that includes a portion for injecting sense signals $v_1$ and $v_2$. While FIG. 5a and FIGS. 5b–5c, described below, show separately driven positioning signals $V_{1L}$, $V_{1H}$, ..., $V_{4L}$, $V_{4H}$ where two drive signals L and H are respectively applied to each quadrant electrodes 571 and 570, electrodes in each quadrant may be commonly driven using only one signal. Also, while sense signals $v_1$ and $v_2$ are shown in FIGS. 5a–5c as applied along separate lines from positioning signals, they may be switched and injected into the one or more position signal lines that control a micro-mirror quadrant.

Capacitance in each quadrant a to d is sensed at conductive portions of mirror plate 122-a by a differential capacitance sense circuit 520, such as the TIA configuration described above. A switching control voltage schematically illustrated by line 528 coordinates the sensing operation of sense circuit 520 with X and Y hemi-circle switching. Switched output 522 is demodulated and processed by methods such as those disclosed in copending application Ser. No. 09/756,675, filed Jan. 10, 2001, and which is incorporated by reference, to form a feedback and/or actual position signal pair $V_{cx}$ and $V_{cy}$.

The second exemplary embodiment of sensing circuitry of the present invention and conceptually illustrated in FIG. 5a requires a sequential switching of applied capacitance sense carrier signals to measure a micro-mirror's tip about each axis. However, because all four electrode quadrants are used in each measurement, the sensed signal is approximately doubled, and thus provides an improved SNR as compared with the method shown in FIGS. 4. Additionally, the method in accordance with the second embodiment no longer requires circuitry for computing (1) and (2), above, such as the mixer, because direct X and Y position readout is provided.

FIG. 5b illustrates an exemplary sense circuit and mirror electrode configuration using a first circuit arrangement for sensing the above-described hemi-circle coupling using pairwise switched mirror electrodes in accordance with the present invention. In FIG. 5b, the same reference numbers used in FIG. 4 refer to the same or like parts that are described above. A differential capacitance measurement between the upper and lower hemi-circles of the mirror electrode configuration is made by simultaneously closing the X switches, opening the Y switches. At this time, drivers 514 and 516 provide carrier signal with an oscillating frequency set by oscillator 518 from drive circuitry portion 512. The carrier signal $v_1$ from driver 514 may be injected into mirror drive signals controlling electrodes 570a, 571a, 570b and 571b, and the carrier signal $v_2$ from drive circuitry 516 is injected into mirror drive signals controlling electrodes 570c, 571c, 570d and 571d. Alternatively, in a segmented mirror and sense electrode configuration, such as the ones described above, the carrier signals may be applied to segmented sense electrodes instead of being injected into the drive signals, or in a combination of segmented sense and drive electrodes. The displacement current resulting from the mirror node at mirror plate 122-a is provided to differential capacitance sense circuit 520 for current-to-voltage conversion. The output 522 from sense circuit 520 is switched and processed as described above with respect to FIG. 5a.

After a tip of a micro-mirror 122 about the X-axis 126 is measured, the X switches are opened, the Y switches are closed to measure a mirror tip about the Y-axis 127. The angular measurement of the mirror tip about the X- and Y-axis are performed in a sequential fashion to provide $V_{cx}$ and Vcy readout for position sensing and/or controller feedback. Unlike the first embodiment, the demodulated signal of the second embodiment provides a direct X and Y position readout, $V_{cx}$ and $V_{cy}$, instead of the convolved "X+Y" and "X–Y" readout shown by (1) and (2) above.

FIG. 5c illustrates an exemplary sense circuit and mirror electrode configuration using a second circuit arrangement for sensing the above-described hemi-circle coupling using pairwise switched mirror electrodes in accordance with the present invention. In FIG. 5c, the same reference numbers used in FIG. 5b refer to the same or like parts that are described above. The circuit of FIG. 5c differs from the circuit shown in FIG. 5b in that it switches carrier signals between the hemi-circles of the mirror electrode configuration by using switches 502 and 503, such as single pole double throw switches. When switches 502 and 503 are in the X position, carrier signal from driver 514 is applied to the mirror electrodes 570a, 571a, 570b and 571b, and carrier signal from driver 516 is applied to the mirror electrodes 570c, 571c, 570d and 571d. After the $V_{cx}$ readout is obtained from processed output 522, both switches are flipped to the Y position to obtain the $V_{cy}$ position/feedback readout. As with the switching method illustrated in FIG. 5b, the X and Y switch positions may be sequentially switched back and forth to provide a nearly continuous readout of the micromirror angular position.

Figure 6:
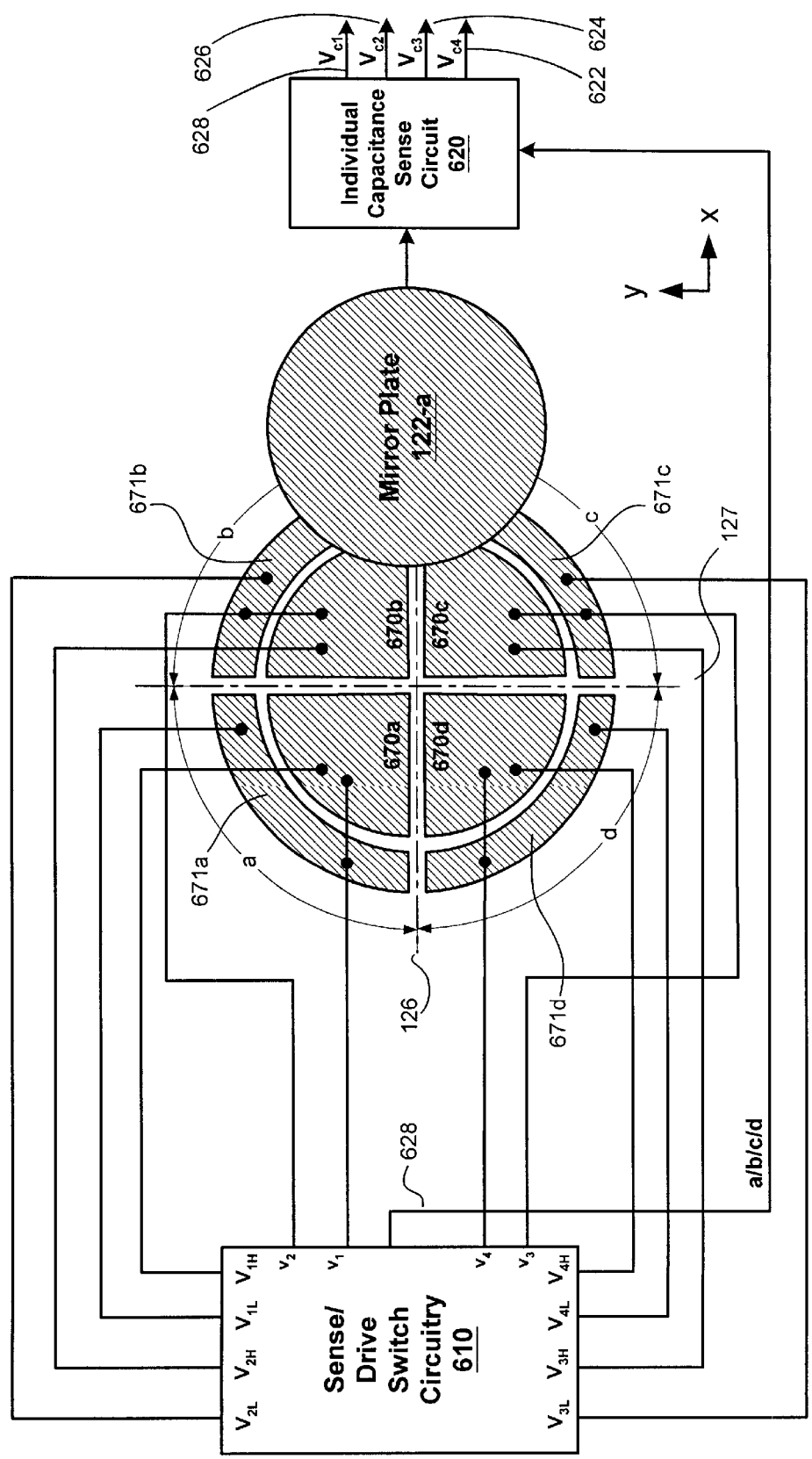
FIG. 6 is a schematic illustrating an exemplary fifth circuit arrangement for sensing a capacitance signal in accordance with the present invention.

FIG. 6 shows an exemplary third embodiment of the present invention in which each individual electrode quadrant is sensed instead of sensing differential pairs of mirror electrodes. A differential measurement may be made for each of the four mirror micro-mirror quadrants a to d by comparing a sensed capacitance across one or more mirror electrodes 670 and 671 in a mirror quadrant, and mirror plate 122-a, to an "on-chip" reference capacitor. All four sensed capacitance measurements are converted to voltages $V_{c1}$ to $VC_4$ that may be combined using simple addition and subtraction circuits, or digitally processed, to determine $V_{cx}$ and $V_{cy}$.

As with sensing across diagonal quadrants, described above, carrier signals for sensing capacitance in the electrode configuration of FIG. 6 may be applied simultaneously to all electrode quadrants, or switched in a time-sharing manner between each quadrant to periodically sense capacitance in each mirror quadrant. For simultaneous carrier signal application, sense/drive switch circuitry 610 may include four separate AC drivers, each having a different oscillation frequency. Continuously sensed capacitance readout may be obtained by supplying output 622–628 from individual capacitance sense circuit 620 to four demodulation circuits (not shown). A differential mixer or digital processing unit, such as those described in copending application Ser. No. 09/756,675, filed Jan. 10, 2001, and incorporated by reference, may process the demodulated output to determine $V_{cx}$ and $V_{cy}$. Periodic sensing may be accomplished by providing one carrier signal driver in circuitry 610 that sequentially switches the carrier signal onto electrodes 670 and/or sidewall electrodes 671, and by providing one carrier driver to the on-chip reference capacitor. The periodically sensed signals may be sampled and held using SHA amplifiers (not shown) that are switched by a signal a, b, c, or d on line 628 in correspondence with the driver sequence. Output 622 to 628 is then provided to an analog mixer or a digital processing unit. For a more detailed description of periodically switched sensing, see copending application Ser. No. 09/756,675.

In FIGS. 4 to 6, pivoting axes 126 and 127 are shown as respectively coinciding in plan view with mirror electrode axes. However, it is to be understood that coinciding axes are not necessary because any angular relationship may exist between the electrode axes and mirror rotational axes as long as the electrodes are driven accordingly. For example, the pivoting axes 126 and 127 may be physically rotated, such as shown in FIGS. 3a and 3c, where a 45° offset exists between the pivoting axes 126 and 127 and mirror axes 128 and 129. This arrangement provides a structure for straightforward $V_{cx}$ and $V_{cy}$ computation using differential measurements across mirror electrode quadrants b and d using combinations of electrodes underlying micro-mirror 122 and/or sidewall electrodes in quadrants b and d (for tips about the y-axis), and combinations of the electrodes underlying micro-mirror 122 and/or sidewall electrodes in quadrants a and c using combinations of the electrodes underlying micro-mirror 122 and/or sidewall electrodes in quadrants a and c (for tips about the x-axis).

FIGS. 7a to 9b illustrate several exemplary variations of micro-mirror units that may be used while practicing the present invention. These figures and their descriptions are provided to illustrate some of the various modifications and adaptations possible to the structures and methods previously described. Elements of FIGS. 7a to 9b with same reference numbers refer to same or like parts described above.

Figure 7A:
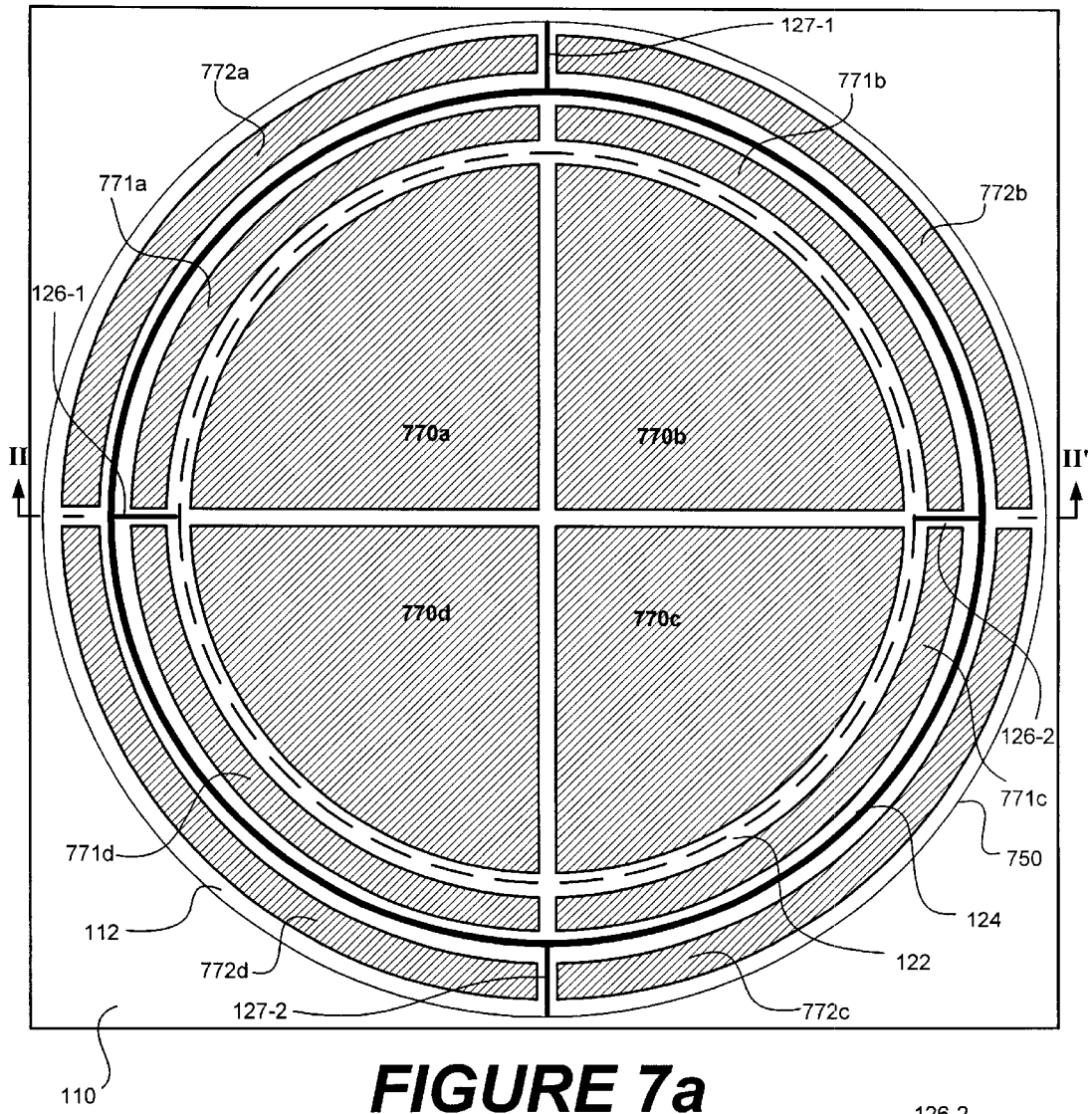
FIG. 7a provides a second exemplary sidewall electrode arrangement for use in an optical switch in accordance with the present invention.

FIG. 7a is illustrative of a second exemplary micro-mirror electrode arrangement of the present invention. As shown in FIG. 7a, the second exemplary arrangement differs from the ones shown in FIGS. 3–6 in that an additional segmented sidewall electrode ring 772 is provided. Within mirror well 750, electrodes 771a to 771d are provided in respective quadrants a to d to surround electrodes 770a to 770d that underlie micro-mirror 122. Mirror mount 124 surrounds the first group of segmented sidewall electrodes 771, when viewed from above. A second group of segmented sidewall electrodes 772 surround mirror mount 124, when viewed from above. The additional group of sidewall electrode segments 772a to 772d together with the rim of the micromirror 122 and/or the mirror mount 124 provide additional capacitance to increase the torque for driving the micromirror 122 motion and/or the signal for capacitance sensing.

Figure 7B:
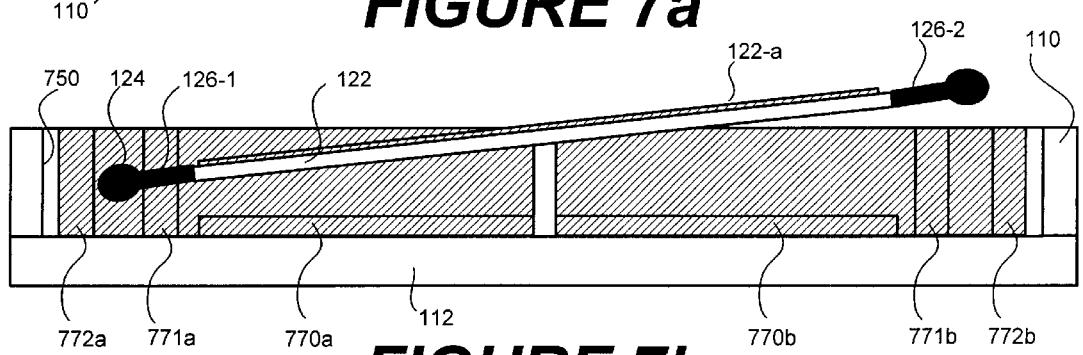
FIG. 7b provides a cross-sectional view of FIG. 7a taken along line II–II'.

As shown in FIG. 7b, as micro-mirror 122 moves about pivoting axes 127-1 and 127-2, mirror mount 124 sweeps an arc within the space formed by electrodes 771a and 772a. Since mirror mount 124 also pivots about axes 126-1 and 126-2 and may take any angle α in its operating range at any point of reference about mirror well 750, it may sweep an arc between any set of electrodes 771 and 772 in each quadrant a to d. Sidewall heights may vary from electrodes 771 and 772, and each may be provided with separate drive voltages. In each electrode quadrant, any combination of electrodes 770, 771, and 772 may be used to sense capacitance and/or move micro-mirror 122. For example, electrodes 771 and 772 may be driven in tandem to move micro-mirror 122 in lower valued angles of the mirror angular operating range while a combination of electrodes 771 and/or 772 and electrodes 770 may be used to move the mirror into the larger angles of the range. Alternatively, other groups of electrodes, including all electrodes 770–772, may be used to drive the mirror movement and/or sense the mirror position. Moreover, while electrodes 771 and 772 are shown as having a height (measured vertically from the well floor) substantially equal to the plane of an unbiased horizontal micro-mirror 122, electrodes 771 and/or 772 may be formed as head-less electrodes, such as described above.

Figure 8A:
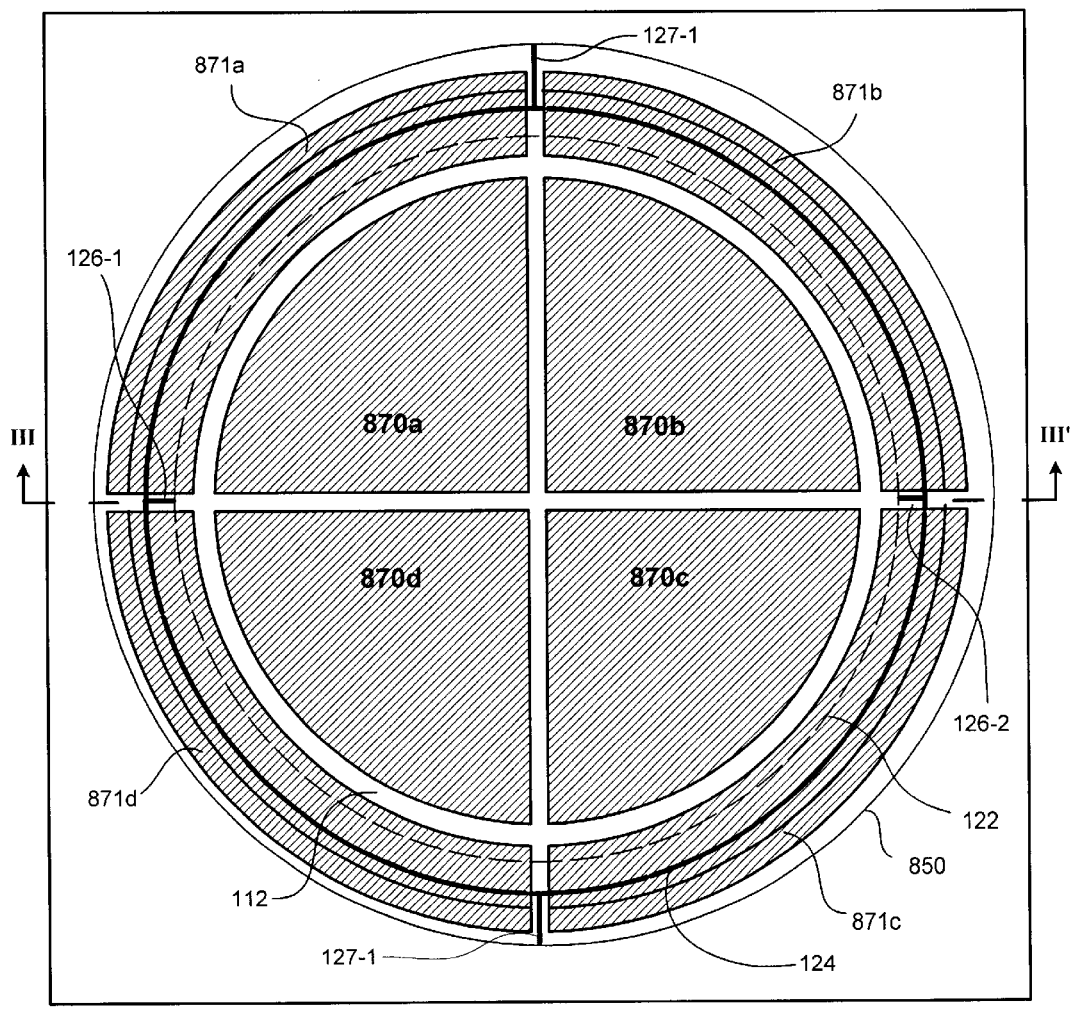
FIG. 8a provides a third exemplary sidewall electrode arrangement for use in an optical switch in accordance with the present invention.
Figure 8B:
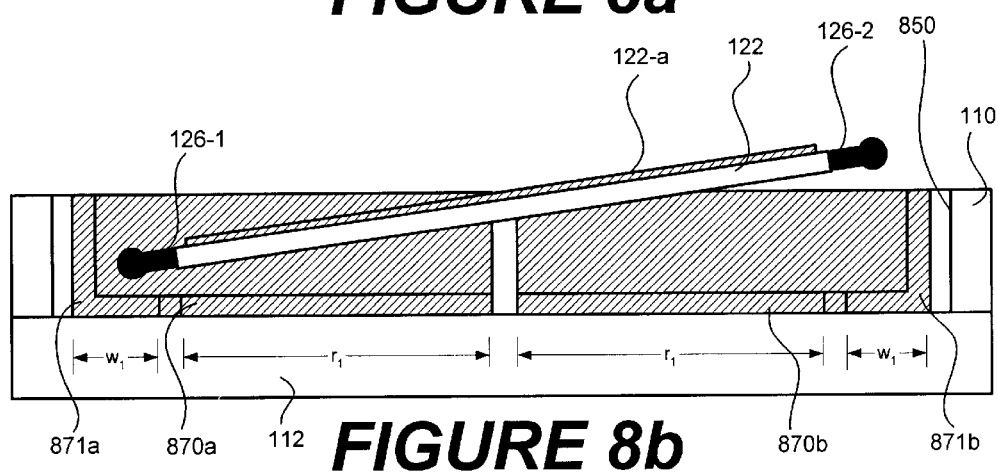
FIG. 8b provides a cross-sectional view of FIG. 8a taken along line III–III'.

FIGS. 8a and 8b illustrate a third exemplary micro-mirror electrode arrangement of the present invention. In FIG. 8a, sidewall electrodes 871a to 871d having an L-shape are provided in respective quadrants a to d in a mirror well 850. Mirror mount 124 is provided within the vertically extended portions of L-shaped sidewall electrodes 871a to 871d formed into a segmented ring. Mirror mount 124 also is provided above the horizontally extending portion of each L-shaped electrode segment 871. Utilizing L-shaped sidewall electrodes in a micro-mirror unit 120 allows a level of flexibility for tailoring the mirror angle α for a particular drive voltage applied to an electrode 871 or electrode combination of electrodes 870 and 871.

As shown in FIG. 8b, the portion of each L-shaped electrode 871 on the bottom of mirror well 850 has a width, $w_1$, that may be adjusted to control the maximum angle α that the sidewalls alone may achieve. For example, increasing width $w_1$ while decreasing a radial length $r_1$ of electrodes 870 increases the lateral extent of the electric field under mirror 122 and thus may increase a particular maximum operating angle $\alpha_{max}$ of an angular operating range that may be controlled using electrodes 871. Conversely, decreasing width $w_1$ reduces a maximum angle attainable when using the L-shaped sidewall electrodes exclusively to move the mirror. Electrodes 870a to 870d that underlie micro-mirror 122 may be reserved for capacitance sensing. Alternatively, electrodes 870a to 870d may be driven with control voltages separate from the sidewall electrodes and in conjunction with respective sidewall electrodes 871a to 871d to attain larger angles $\alpha$ of an angular operating range. Electrodes 870 also may be eliminated with an appropriate width $w_1$ of the L-shaped sidewall electrodes 871. While electrodes 871 are shown as having a height (measured vertically from the well floor) substantially equal to the plane of an unbiased horizontal micro-mirror 122, electrodes 871 may be formed as head-less electrodes, such as described above.

Figure 9A:
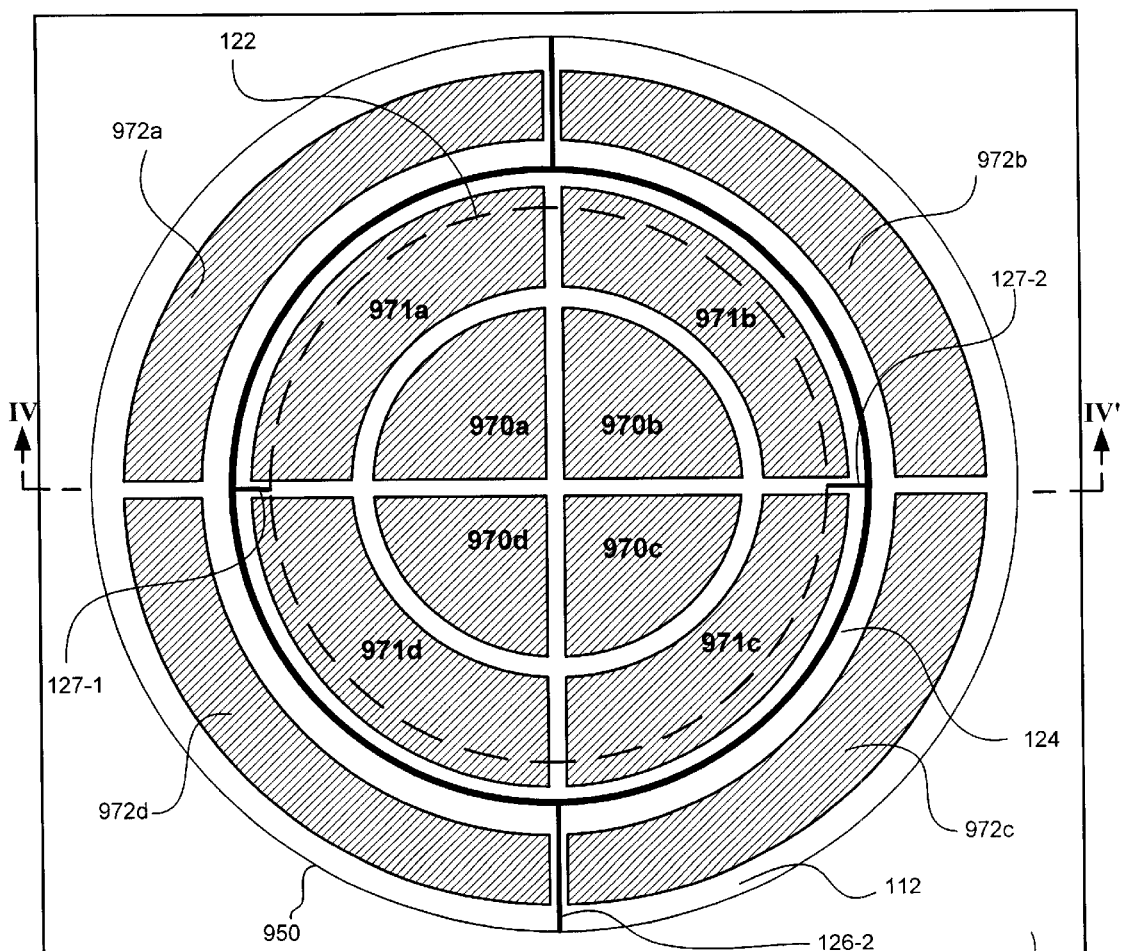
FIG. 9a provides a fourth exemplary sidewall electrode arrangement for use in an optical switch in accordance with the present invention.
Figure 9B:
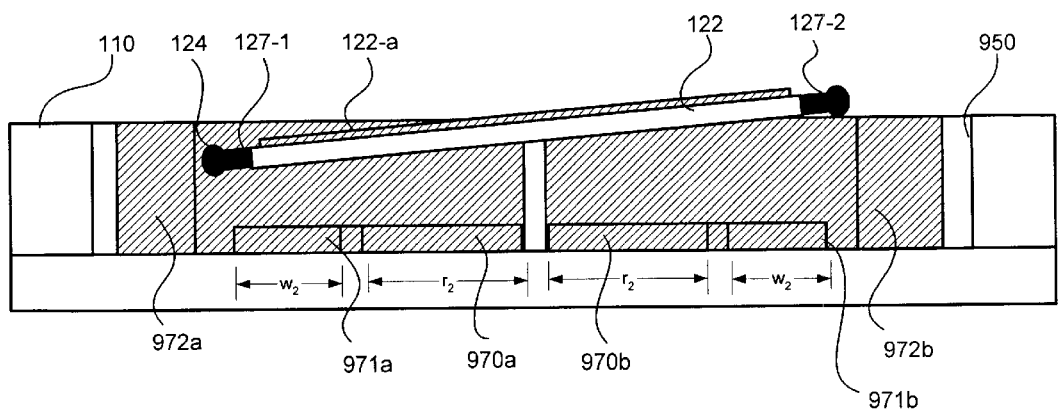
FIG. 9b provides a cross-sectional view of FIG. 9a taken along line IV–IV'.

FIGS. 9a and 9b are illustrative of a fourth exemplary micro-mirror electrode arrangement of the present invention. In FIG. 9a, sidewall electrodes 972a to 972d are provided in respective electrode quadrants a to d of mirror well 950. Mirror mount 124 lies within sidewall electrodes 972 in a fashion similar to the arrangements of FIGS. 3 to 6. On the bottom of mirror well 950, each quadrant a to d includes respective inner electrode portions 970a to 970d that underlie micro-mirror 122 and respective outer planar electrode portions 971a to 971d that underlie micro-mirror 122 and/or mirror mount 124. In each electrode quadrant a to d, electrodes 971 may be used alone or in a cooperative fashion with electrodes 972 and/or electrodes 970 to drive micro-mirror 122 for positioning and/or sense a signal provided for capacitance sensing.

Utilizing electrodes 970 and 971 in the fourth exemplary electrode arrangement provides a level of flexibility for tailoring the mirror angle for a particular operating voltage, or for a combination of drive voltages provided by a plurality of electrodes 970, 971 and/or 972. As shown in FIG. 9b, the width $w_2$ of outer electrode portions 971a to 971d may be adjusted with width $r_2$ of inner portions 970a to 970d to define an operating range of driving voltages to move the mirror, and/or to allow for different driving techniques, such as cooperative methods described above for attaining mirror angles in a lower and higher end of an angular operating range. For example, in each quadrant a to d, electrodes 971 and 972 may be exclusively driven to move the mirror in a common or cooperative fashion, and inner planar electrode portions 970a to 970d may provide capacitance sensing exclusively, or in combination with respective electrodes 971a to 971d and/or respective sidewall electrodes 972a to 972d. As another example, in each quadrant a to d, electrodes 970 and 971 may be commonly driven to move micro-mirror 122, while electrodes 972 are used exclusively for sensing. Moreover, while electrodes 972 are shown as having a height substantially equal to the plane of an unbiased horizontal micro-mirror 122, electrodes 972 may instead be formed as head-less electrodes, such as described above.

As should be clear from the embodiments described above, the present invention presents ways to provide a structure and method for controlling and monitoring an angular mirror position in an optical switch having movable micro-mirrors. Sensed capacitance and torque applied to a micro-mirror is enhanced by using sidewall electrodes having segments that extend vertically from a mirror well floor and are positioned near the periphery of the movable micro-mirror. Reliable control of mirror movement is also attained by the flexibility in design provided by segmented sidewall electrodes. Thus, the present invention provides a structure that is useful in system architectures requiring precise and stable mirror positioning.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical switch, comprising:
   a plurality of input optical fibers for carrying a plurality of input optical signals;
   a plurality of output optical fibers;
   an optical switch mechanism for selectively coupling the input optical signals to selected output optical fibers, the optical switch including a substrate and a plurality of micro-mirrors on the substrate, wherein at least one of the micro-mirrors is pivotable relative to the substrate about a first axis and about a second axis perpendicular to the first axis;
   a first plurality of electrodes underlying the at least one micro-mirror; and
   a second plurality of electrodes substantially surrounding the first plurality of electrodes, wherein each of the second plurality of electrodes has an elongated sidewall portion that extends in a first direction substantially orthogonal to the first and second axes and a height in the first direction greater than a height of the first plurality of electrodes.

2. The optical switch according to claim 1, further comprising:
   a mirror mount associated with the at least one micro-mirror and connected to the substrate along one of the first and second axes, wherein the second plurality of electrodes are spaced outwardly of and adjacent to a periphery of the mirror mount.

3. The optical switch according to claim 2, further comprising:
   a third plurality of electrodes surrounding the second plurality of electrodes, wherein each of the third plurality of electrodes have an elongated sidewall portion that extends in a first direction substantially orthogonal to the first and second axes and a height in the first direction greater than a height of the first plurality of electrodes.

4. The optical switch according to claim 3, further comprising:
   a mirror position sensor associated with the at least one micro-mirror for sensing capacitances indicative of the rotational position of the micro-mirror about the first and second axes and for generating sensed position signals based on the sensed capacitances.

5. The optical switch according to claim 4, wherein the sensed capacitance includes a capacitance between at least one of the first, second, and third plurality of electrodes and the at least one micro-mirror.

6. The optical switch of claim 5, wherein the plurality of micro-mirror electrodes are arranged in quadrature configuration, and the capacitance values are obtained by sensing capacitance of one or more electrodes each individual electrode quadrant with respect to the micro-mirror.

7. The optical switch according to claim 4, wherein the sensed capacitance includes a capacitance between at least one of the first, second, and third plurality of electrodes, and the at least one micro-mirror.

8. The optical switch according to claim 3, further comprising:
controller circuitry associated with the at least one micro-mirror, wherein the third plurality of electrodes receive voltages from the controller circuitry for applying a torque to the at least one micro-mirror about at least one of the first and second axes.

9. The optical switch according to claim 3, wherein the extent of the height of at least one of the second plurality and the third plurality of electrodes is below a plane defined by the first and second axis.

10. The optical switch according to claim 2, further comprising:
an electrically conductive region provided on the mirror mount.

11. The optical switch according to claim 1, further comprising:
a mirror position sensor associated with the at least one micro-mirror for sensing capacitances indicative of the rotational position of the micro-mirror about the first and second axes and for generating sensed position signals based on the sensed capacitances.

12. The optical switch according to claim 11, further comprising:
a mirror mount associated with the at least one micro-mirror and connected to the substrate along one of the first and second axes; wherein the sensed capacitance includes a capacitance between at least one of the first and second plurality of electrodes and the mirror mount.

13. The optical switch according to claim 11, wherein the sensed capacitance includes a capacitance between at least one of the first and second plurality of electrodes and the at least one micro-mirror.

14. The optical switch according to claim 11, wherein the first and second plurality of electrodes are positioned in a quadrature arrangement and the mirror position sensor senses the capacitances by sequentially switching between pairs of the electrodes.

15. The optical switch according to claim 11, wherein the first and second plurality of electrodes are arranged in quadrature configuration defining four quadrants, and one of the capacitance values is obtained by first sensing a differential capacitance across a first and second group of the first and second plurality of electrodes and the micro-mirror, wherein the first group of electrodes comprises adjacent electrodes in a first half of the quadrature configuration and the second group comprises adjacent electrodes in a second half of the quadrature configuration.

16. The optical switch of claim 11, further comprising:
controller circuitry associated with the at least one micro-mirror, wherein the first and second pluralities of electrodes are arranged in a quadrature configuration and receive voltages from the controller circuitry for moving the at least one micro-mirror, and the mirror position sensor includes the first and second pluralities of electrodes, of which some are sense capacitance separate from the drive electrodes.

17. The optical switch according to claim 11, wherein the first and second pluralities of electrodes are arranged in a quadrature configuration, and the capacitance values are obtained by sensing capacitance between the conductive portions of the micro-mirror and diagonally-disposed pairs of the micro-mirror electrodes.

18. The optical switch according to claim 1, further comprising:
a third plurality of electrodes underlying the at least one micro-mirror and surrounding the first plurality of electrodes with a gap therebetween.

19. The optical switch according to claim 18, further comprising:
a mirror position sensor associated with the at least one micro-mirror for sensing capacitances indicative of the rotational position of the micro-mirror about the first and second axes and for generating sensed position signals based on the sensed capacitances.

20. The optical switch according to claim 19, further comprising:
controller circuitry associated with the at least one micro-mirror, wherein the second and third plurality of electrodes receive voltages from the controller circuitry for cooperatively applying a torque to the at least one micro-mirror about at least one of the first and second axes.

21. The optical switch according to claim 20, wherein the first plurality of electrodes receive signals that are separate from the voltages for applying a torque to the at least one micro-mirror for sensing a capacitance between the first plurality of electrodes and the at least one micro-mirror.

22. The optical switch according to claim 1, wherein each electrode of the second plurality of electrodes has an L-shaped cross-section.

23. The optical switch according to claim 22, wherein a portion of each L-shaped electrode of the second plurality of electrodes underlies the at least one of the micro-mirrors.

24. The optical switch according to claim 22, Wherein the extent of the height of the second plurality of electrodes is below a plane defined by the first and second axis.

25. The optical switch according to claim 1, further comprising:
a mirror mount associated with the at least one micro-mirror and connected to the substrate along one of the first and second axes, wherein the second plurality of electrodes are spaced outwardly and extend adjacent to a periphery of the mirror mount.

26. The optical switch according to claim 1, wherein the extent of the height of the second plurality of electrodes is below a plane defined by the first and second axis.

27. The optical switch according to claim 1, further comprising:
controller circuitry associated with the at least one micro-mirror, wherein the second plurality of electrodes receive voltages from the controller circuitry for applying a torque to the at least one micro-mirror about at least one of the first and second axes.

28. The optical switch according to claim 1, wherein the switching mechanism is a MEMS-based switching mechanism.

* * * * *